(12) United States Patent
Ishiwata et al.

(10) Patent No.: US 6,872,074 B2
(45) Date of Patent: Mar. 29, 2005

(54) METHOD FOR DISCHARGING REDUCED PRODUCT FROM A MOVABLE-HEARTH FURNACE AND A DISCHARGING DEVICE

(75) Inventors: Natsuo Ishiwata, Chiba (JP); Tatsuya Ozawa, Chiba (JP); Yoshitaka Sawa, Chiba (JP); Tetsuya Yamamoto, Chiba (JP); Kanji Takeda, Chiba (JP); Tetsuya Kikui, Chiba (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 10/838,448

(22) Filed: May 4, 2004

(65) Prior Publication Data

US 2004/0202979 A1 Oct. 14, 2004

Related U.S. Application Data

(62) Division of application No. 10/000,564, filed on Oct. 24, 2001.

(30) Foreign Application Priority Data

| Oct. 31, 2000 | (JP) | ................................. 2000-331832 |
| Nov. 22, 2000 | (JP) | ................................. 2000-356679 |
| Nov. 22, 2000 | (JP) | ................................. 2000-356680 |
| Mar. 21, 2001 | (JP) | ................................. 2001-080198 |
| Mar. 21, 2001 | (JP) | ................................. 2001-080929 |
| Mar. 23, 2001 | (JP) | ................................. 2001-083927 |
| Mar. 27, 2001 | (JP) | ................................. 2001-090330 |

(51) Int. Cl.$^7$ ................................................. F27B 9/18
(52) U.S. Cl. ...................... 432/137; 432/138; 432/139
(58) Field of Search ................................. 432/137, 138, 432/139; 75/483, 484, 485; 266/137, 160, 177, 183, 195

(56) References Cited

U.S. PATENT DOCUMENTS 3,448,857 A  6/1969  Benson et al.
3,625,354 A  12/1971 Heitmann
4,023,738 A  5/1977  Ogihara et al.
4,049,444 A  9/1977  Bell et al.
4,123,850 A * 11/1978 Niems .......................... 34/432
4,451,360 A  5/1984  Salmi
6,036,744 A  3/2000  Negami et al.
6,126,718 A  10/2000 Sawa et al.
6,210,462 B1 4/2001  Kikuchi et al.
6,251,161 B1 * 6/2001 Tateishi et al. ............... 75/484
6,264,721 B1 7/2001  Takeda et al.
6,270,552 B1 8/2001  Takeda et al.
6,319,302 B1 * 11/2001 Harada ......................... 75/484

FOREIGN PATENT DOCUMENTS

| DE | 34 16 504 A1 | 11/1985 |
| EP | 0 086 488 A2 | 8/1983 |
| EP | 0 305 881 A1 | 3/1989 |
| EP | 0 969 105 A1 | 1/2000 |
| EP | 1 026 265 A1 | 8/2000 |
| FR | 2 691 718 A1 | 12/1993 |
| GB | 2 007 538 A | 5/1979 |
| JP | 54005269 | 1/1979 |
| WO | WO 99/16912 | 4/1999 |
| WO | WO 99/16913 | 4/1999 |

* cited by examiner

*Primary Examiner*—Jiping Lu
(74) *Attorney, Agent, or Firm*—DLA Piper Rudnick Gray Cary US LLP

(57) ABSTRACT

A method for discharging a reduced product produced on a movable hearth of a movable-hearth furnace uses a discharging device. The discharging device includes a removal unit for removing the reduced product from the movable hearth, a separation unit for separating the reduced product from a solid reductant, a leaving-returning unit for either leaving substances other than the reduced product on a solid reductant layer or returning the substances onto the solid reductant layer, and a discharge unit for discharging the reduced product to the outside of the movable-hearth furnace.

6 Claims, 22 Drawing Sheets

PRIOR ART

METHOD FOR DISCHARGING REDUCED PRODUCT FROM A MOVABLE-HEARTH FURNACE AND A DISCHARGING DEVICE

RELATED APPLICATIONS

This application is a divisional of application Ser. No. 10/000,564, filed on Oct. 24, 2001, which claims priority of JP 2000-356679, filed Nov. 22, 2000, JP 2001-080929, filed Mar. 21, 2001, JP 2000-356680, filed Nov. 22, 2000, JP 2001-080198, filed Mar. 21, 2001, JP 2001-083927, filed Mar. 23, 2001, JP 2001-090330, filed Mar. 27, 2001, and JP 2000-331832, filed Oct. 31, 2000, incorporated herein by reference.

BACKGROUND

1. Field of the Invention

This invention relates to a technology for discharging products from a movable-hearth furnace. In particular, this invention relates to a technology for discharging a reduced product to the outside from a movable-hearth furnace and a discharging device of the reduced product, the reduced product being obtainable such that raw materials including metallic ingredients such as ores containing minerals and dust and sludge produced in ironworks and industrial wastes are accumulated on a movable hearth together with a solid reductant, and the accumulated raw materials are reduced. Particularly, the invention relates to a technology for selecting a reduced product having a large grain size and discharging the reduced product, and a device for separating the reduced product from a reductant to be left in a furnace.

2. Description of the Related Art

Steel, which is a typical reduced metal, is generally produced in a converter or an electric furnace. For example, scrap and reduced iron are melted with heat by using electric energy, and are smelted, as needed, thereby forming steel in an electric furnace. Recently, however, the supply of and demand for scrap are tight, and high-quality steel is sought on an increasing basis. Therefore, there is a tendency to use reduced iron.

A so-called "movable-hearth-furnace" method which is a process for manufacturing reduced iron and the like is disclosed in, for example, Japanese Unexamined Patent Application Publication No. 63-108188, in which an iron ore and a solid reductant are charged and deposited on a hearth movable in a horizontal direction, and the iron ore is heated and reduced by radiation heat transfer by a burner from above the hearth, thereby manufacturing the reduced iron. In a movable-hearth furnace used in this method, the raw material is charged and heated while the hearth is horizontally moved in a heating zone, generally, in a circle (revolving). In other words, a rotary hearth furnace is used.

In the rotary hearth furnace, pellets including an iron ore and a solid reductant are charged and heated on the hearth, thereby reducing the iron ore and producing reduced pellets. The hearth of the furnace moves in a heated furnace. Therefore, a heat-resistive material is applied on a surface of the hearth, or, sometimes, heat-resistive grains are deposited on the heat-resistive material applied on the surface, thereby protecting the surface of the hearth.

A rotary-hearth furnace as a movable-hearth furnace is disclosed in, for example, Japanese Unexamined Patent Application Publication No. 11-172312. In FIG. 1, the rotary-hearth furnace includes an annular furnace 10 provided with a pre-heating zone 10a, a reducing zone 10b, a melting zone 10c, and a cooling zone 10d, and an annular movable hearth 11 is disposed in the furnace 10. A mixture 12 of a raw material such as an iron ore and a solid reductant such as coal, coal char and coke is charged and deposited on the movable hearth 11. A heat-resistive material is applied to the surface of the movable hearth 11 of the furnace 10. However, the movable hearth 11 may be protected with a layer of a solid reductant which is formed between the movable hearth 11 and the mixture 12.

Burners 13 are disposed in an upper part of the furnace 10. An oxidized material including metals, such as iron ore, deposited on the movable hearth 11 is heated and reduced by using heat of combustion of the burners 13, thereby forming a reduced material such as reduced iron, and the reduced material is further heated to be melted, thereby forming a reduced product including metals with slag. A charging device 14 for charging a raw material onto the movable hearth 11 and a discharging device 15 for discharging a reduced product are shown in FIG. 1. In the technology disclosed in Japanese Unexamined Patent Application Publication No. 11-172312, a bed of a solid reductant having a given thickness is formed by depositing the powdered solid reductant on a hearth, a bed of a metal-containing material having a given thickness is formed by depositing the powdered metal-containing material on the surface of the bed of the solid reductant, and a plurality of concavities are formed in the bed of the metal-containing material from the surface thereof to the surface of the bed of the solid reductant. The metal-containing material heated at the surface thereof is reduced and melted, and gathers in the concavities remaining in the bed of the solid reductant by the effect of surface tensity and gravity of the melted material while being divided into a metal and slag. A plurality of large grains of the metal with slag are obtained in the concavities by cooling the melted material.

The reduced product and the like produced on the movable hearth 11 are generally discharged by using the discharging device 15 from the movable hearth 11 to the outside of the furnace. A screw-feeder-type discharging device as a device for discharging the reduced product and the like from a hearth is disclosed in, for example, Japanese Unexamined Patent Application Publication No. 11-172312. The screw-feeder-type discharging device disclosed therein includes a rod 15a provided with a spiral screw 15b fixed around the rod 15a, as shown in FIG. 2. The rod 15a of the screw-feeder-type discharging device is disposed substantially perpendicular to the direction of movement of the movable hearth 11 and rotates on the movable hearth 11, whereby the reduced product 16 including reduced pellets and a metal disposed on the hearth 11 is collected in a direction substantially perpendicular to the direction of movement of the hearth 11 and is discharged from the hearth 11.

The technology is characterized in that the reduced product 16 which is, for example, reduced iron as a metal not including a gangue portion can be substantially completely discharged in a transversal direction of the hearth 11 by driving the screw 15b of the screw-feeder-type discharging device while the screw 15b is substantially in contact with the upper surface of the hearth 11.

Grains of a metal with slag as a reduced product and the solid reductant can be substantially completely discharged by using the above screw-feeder-type discharging device shown in FIG. 2 in the solid-reductant-bed-type reducing-melting process. The discharged grains of the reduced product 16 and the solid reductant are classified by a screen. The grains of a metal with slag are classified as manufactured goods and the solid reductant which falls through the screen is reused in the furnace.

In this technology, a mixed raw material which is a mixture of powdered iron ore and a solid reductant is deposited in a layer on a solid reductant layer 1b disposed on a hearth 11, is reduced at a given temperature, and is heated to be melted and divided into metals and slag, whereby reduced iron not including a gangue portion is produced.

However, when the screw-feeder-type discharging device described above, which collects the produced reduced iron with a screw of the screw-feeder-type discharging device, discharges a pellet-shaped reduced product in particular, there is a risk that the driving device stops when the pellet-shaped reduce product is "bitten" or becomes wedged between the screw and the hearth, which fact acts as a pressing force applied to the hearth, thereby damaging the surface of the hearth.

By the discharging method described above, deposited substances on the movable hearth are completely discharged to the outside. However, there is a drawback in that the reduced product 16 (metals) cannot be separated from the solid reductant so as to be collected (discharged) as a manufactured good, although the substances including metals and slag deposited on the movable hearth can be completely discharged by the known technology.

Another drawback has been found in the known discharging method in that the temperature of the solid reductant is significantly reduced during classification, thereby generating thermal loss, in which the reduced product 16 and the solid reductant 65 are completely discharged to the outside for classification and the solid reductant is recharged into the furnace. The solid reductant is preferably returned into the furnace while it is hot, thereby avoiding thermal loss.

OBJECTS OF THE INVENTION

Accordingly, it is an object of the invention to provide a discharging device and a discharging method using the discharging device in which damage to the hearth of a movable-hearth furnace can be avoided.

It is another object of the invention to provide a discharging device and a discharging method using the discharging device in which a reduced product such as reduced iron can be selectively discharged from a hearth of a movable-hearth furnace, and a solid reductant can be left on the hearth of the movable-hearth furnace, whereby thermal loss can be avoided.

SUMMARY OF THE INVENTION

To these ends, according to an aspect of the invention, a method for discharging a reduced product produced on a movable hearth of a movable-hearth furnace comprises the steps of removing the reduced product from the movable hearth; separating the reduced product from a solid reductant; either leaving substances other than the reduced product on a solid reductant layer or returning the substances onto the solid reductant layer; and discharging the reduced product to the outside of the movable-hearth furnace.

In the method described above, the step of removing the reduced product from the movable hearth may comprise the step of attracting the reduced product by using a magnetic force to remove the reduced product from the movable hearth.

The method for discharging a reduced product produced on a movable hearth of a movable-hearth furnace, according to the invention, may further comprise the step of cooling the reduced product before attracting the reduced product by using a magnetic force to remove the reduced product from the movable hearth.

The step of removing the reduced product from the movable hearth may comprise the step of scooping the reduced product and the solid reductant by using a screen, and the step of separating the reduced product from the solid reductant may comprise the step of sifting the reduced product and the solid reductant according to the grain size of the reduced product and the solid reductant by using the screen.

The step of sifting the reduced product and the solid reductant according to the grain size of the reduced product and the solid reductant by using the screen, whereby the reduced product and the solid reductant having smaller grain sizes are left on the movable hearth, may comprise the step of selecting the reduced product having a larger grain size by using a rotary drum which spans the movable hearth of the movable-hearth furnace in the widthwise direction of the movable hearth and is provided with a plurality of net-shaped or comb-shaped screens each extending in a radial direction of the rotary drum from the periphery thereof.

The step of sifting the reduced product and the solid reductant according to the grain size of the reduced product and the solid reductant by using the screen, whereby the reduced product and the solid reductant having smaller grain sizes are left on the movable hearth, may comprise the step of removing the reduced product having a larger grain size from the solid reductant layer and discharging the reduced product by using a screw feeder which spans the movable hearth in the widthwise direction of the movable hearth and extends to the outside of the movable-hearth furnace, and which operates in such a manner that a part of the solid reductant is left on the solid reductant layer by controlling the position of the axis of the screw feeder with respect to the movable hearth. A plurality of apertures may be formed in a casing of the screw feeder, the apertures being arrayed along the axis of the screw feeder, and the reduced product and the solid reductant having smaller grain sizes may be left on the solid reductant layer by using the casing of the screw feeder. The casing provided with the plurality of apertures may be a cylindrical screen which covers the screw feeder. The method described above may further comprise the steps of classifying the reduced product and the solid reductant according to the grain size; and returning the reduced product and the solid reductant having smaller grain sizes either onto the solid reductant layer formed on the movable hearth of the movable-hearth furnace or to a layer of mixed raw materials formed on the solid reductant layer.

According to another aspect of the invention, a discharging device for discharging a reduced product produced on a movable hearth of a movable-hearth furnace comprises a removal unit for removing the reduced product from the movable hearth; a separation unit for separating the reduced product from a solid reductant; a leaving-returning unit for either leaving substances other than the reduced product on a solid reductant layer or returning the substances onto the solid reductant layer; and a discharge unit for discharging the reduced product to the outside of the movable-hearth furnace.

In the discharging device described above, the removal unit for removing the reduced product from the movable hearth, the separation unit for separating the reduced product from the solid reductant, and the discharge unit for discharging the reduced product to the outside of the movable-hearth furnace may comprise a belt conveyor which opposes the movable hearth at at least one part of the belt conveyor and extends to the outside of the movable-hearth furnace, and at least one magnet which is provided within a circle formed by a belt of the belt conveyor at least at a position opposing the movable hearth and adjacent to the position outside the movable-hearth furnace, the at least one magnet being for attracting the reduced product from the movable hearth, thereby separating the reduced product from the solid reductant.

The at least one magnet may either be disposed in a position opposing the movable hearth with the belt of the belt conveyor therebetween, or be fixed to a rear face of the belt of the belt conveyor.

The removal unit for removing the reduced product from the movable hearth, the separation unit for separating the reduced product from the solid reductant, and the discharge unit for discharging the reduced product to the outside of the movable-hearth furnace may comprise a first belt conveyor which opposes the movable hearth at at least one part of the first belt conveyor and extends to the outside of the movable-hearth furnace, a second belt conveyor which is provided within a circle formed by a belt of the first belt conveyor and is disposed at a position opposing the movable hearth with a lower part of the belt of the first belt conveyor therebetween, the rotation of the first belt conveyor and the second belt conveyor being substantially synchronized with each other, and at least one magnet which is mounted on a rear face of the belt of the second belt conveyor.

The discharging device according to the invention may further comprise a scraper disposed in the vicinity of a portion of the belt conveyor to which a magnetic force is not applied and which is outside the movable-hearth furnace, the scraper being for scraping the reduced product adhered to a front face of the belt of the belt conveyor.

The removal unit for removing the reduced product from the movable hearth and the separation unit for separating the reduced product from the solid reductant comprise a rotary drum which spans the movable hearth of the movable-hearth furnace in the widthwise direction of the movable hearth and is provided with at least one magnet at least at a part of the rotary drum opposing the movable hearth, for attracting the reduced product disposed on the movable hearth, and the discharge unit for discharging the reduced product to the outside of the movable-hearth furnace comprises transfer unit which is disposed in parallel to the axis of the rotary drum, and which receives the reduced product attracted to and falling from the rotary drum and transfers the reduced product to the outside of the movable-hearth furnace.

The rotary drum may comprise an outer drum and an inner roller which is disposed inside the outer drum and which is provided with the at least one magnet fixed to the cylindrical surface of the inner roller. The at least one magnet may extend in the rotational direction of the rotary drum from a lower part of the cylindrical surface to a part thereof associated with the discharge unit. The discharge unit may comprise a belt conveyor which is disposed in parallel to the axis of the rotary drum, and which receives the reduced product attracted to and falling from the rotary drum, and extends from the movable hearth to the outside of the movable-hearth furnace.

The rotary drum may be provided with a plurality of protrusions on a peripheral face of the rotary drum. With this arrangement, the reduced product disposed on the movable hearth can be turned over so that the metal included therein faces toward the magnet, whereby the reduced product can be reliably attracted and separated from the movable hearth and be easily separated from the rotary drum.

The rotary drum may be formed as a cylinder having a smaller diameter at an intermediate part in the axial direction of the cylinder. With this arrangement, the solid reductant layer is prevented from being deformed at the sides of the movable hearth.

A cooling member may be provided for cooling the reduced product before the reduced product has a magnetic field applied thereto so as to be attracted and removed from the movable hearth by the magnetic force. The attracting force of the magnet to the reduced product is preferably increased by cooling the reduced product to a given temperature which is not higher than the Curie point. The same effect is obtainable when the rotary drum is cooled, even when the reduced product has a temperature above the Curie point.

In the discharging device according to the invention, the removal unit for removing the reduced product from the movable hearth and the separation unit for separating the reduced product from the solid reductant may comprise a classifying member including at least one net-shaped or comb-shaped screen protruding from the periphery of a drum in a radial direction thereof, the drum spanning the movable hearth of the movable-hearth furnace in the widthwise direction of the movable hearth, and the discharge unit for discharging the reduced product to the outside of the movable-hearth furnace may comprise a transfer conveyor which transfers the reduced product scooped from the movable hearth by the classifying member.

The transfer conveyor may be disposed in the vicinity of the drum provided with the classifying member and substantially parallel to the axis of the drum, the transfer conveyor being disposed at a position in which the transfer conveyor receives the reduced product falling from the classifying member. The transfer conveyor may be disposed to pass through the drum in the axial direction thereof, and the drum may be provided with at least one opening formed in the drum in the vicinity of the net-shaped or comb-shaped screen such that the reduced product scooped by the at least one net-shaped or comb-shaped screen is received by the transfer conveyor through the at least one opening.

The discharging device according to the invention may further comprise side plates individually disposed at sides of the movable hearth along the direction of movement of the movable hearth, for preventing a deposited substance from collapsing. The net-shaped or comb-shaped screen may be provided with a bent part formed at an end (the free end) thereof.

The removal unit for removing the reduced product from the movable hearth, the separation unit for separating the reduced product from the solid reductant, and the discharge unit for discharging the reduced product to the outside of the movable-hearth furnace may comprise a screw feeder which spans the movable hearth in the widthwise direction thereof and extends to the outside of the movable-hearth furnace, and a casing disposed at the downstream side of the screw feeder in the direction of movement of the movable hearth, the casing being formed with a sidewall extending along the axis of the screw feeder and a bottom plate extending from the sidewall substantially in parallel to the movable hearth.

The casing may be provided with a plurality of apertures. The reduced product which has a grain size larger than that of the solid reductant can be separated from the solid reductant by using a screen. Therefore, the casing is preferably provided with apertures through which the solid reductant having a smaller grain size can pass and the reduced product having a larger grain size cannot pass. A major portion of the solid reductant which enters between the screw feeder and the casing passes through the apertures and falls onto the movable hearth at the downstream side of the discharging device. The apertures may be formed in slits in the sidewall and/or the bottom plate of the casing, or a metallic net or the like which has mesh openings each having substantially the same size as the aperture may be mounted on the casing.

The removal unit for removing the reduced product from the movable hearth, the separation unit for separating the reduced product from the solid reductant, and the discharge unit for discharging the reduced product to the outside of the movable-hearth furnace may comprise a screw feeder which spans the movable hearth in the widthwise direction thereof, a reductant-discharging shooter disposed at a position associated with an end part of the screw feeder protruding to the outside of the movable-hearth furnace, a reduced-product-discharging shooter disposed toward an outer side of the movable-hearth furnace from the reductant-discharging shooter, and a cylindrical screen which covers the end part of the screw feeder associated with the position at which the reductant-discharging shooter is disposed, the rotation of the cylindrical screen being synchronized with that of the screw feeder. The reduced-product-discharging shooter may be positioned at an open end of the cylindrical screen.

The removal unit for removing the reduced product from the movable hearth, the separation unit for separating the reduced product from the solid reductant, and the discharge unit for discharging the reduced product to the outside of the movable-hearth furnace may comprise a guide plate disposed in a discharge section of the movable hearth, for reducing the width of an accumulative layer of the reduced product and the solid reductant, and a screw feeder disposed in a direction substantially perpendicular to the direction of movement of the movable hearth and provided with a tapered part toward a discharge end of the screw feeder on the movable hearth, an end part of the screw feeder from the tapered part to the end thereof protruding to the outside of the movable-hearth furnace being formed as a reduced-diameter part. A conical collecting shooter may be disposed at the tapered part of the screw feeder. A discharge cylinder may be disposed about the reduced-diameter part of the screw feeder toward the discharge end thereof from the conical collecting shooter. The discharge cylinder may be provided with a net-shaped screen at a portion of the discharge cylinder associated with the movable hearth. A reduced-product-discharging shooter may be provided at an open end of the discharge cylinder disposed at the outside of the movable-hearth furnace.

DESCRIPTION OF THE PREFERRED EMBODIMENTS

A movable-hearth furnace and a discharging method according to embodiments of the invention are described below.

Figure 18A:
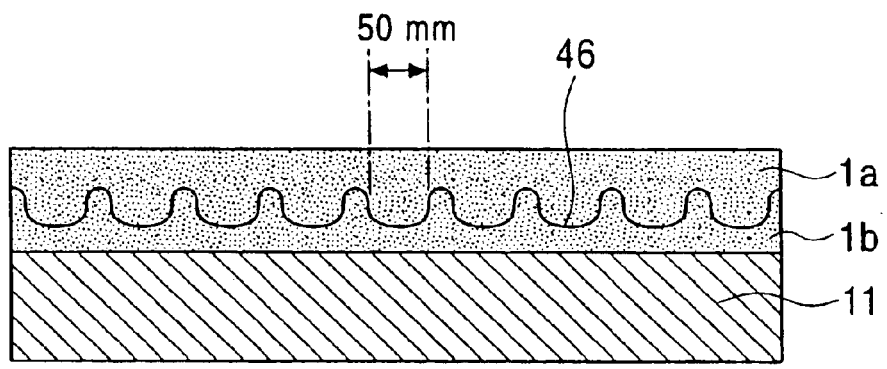
FIG. 18A is a sectional view of a portion of the movable hearth, a solid reductant layer formed on the movable hearth, and a material layer formed on the solid reductant layer.
Figure 18B:
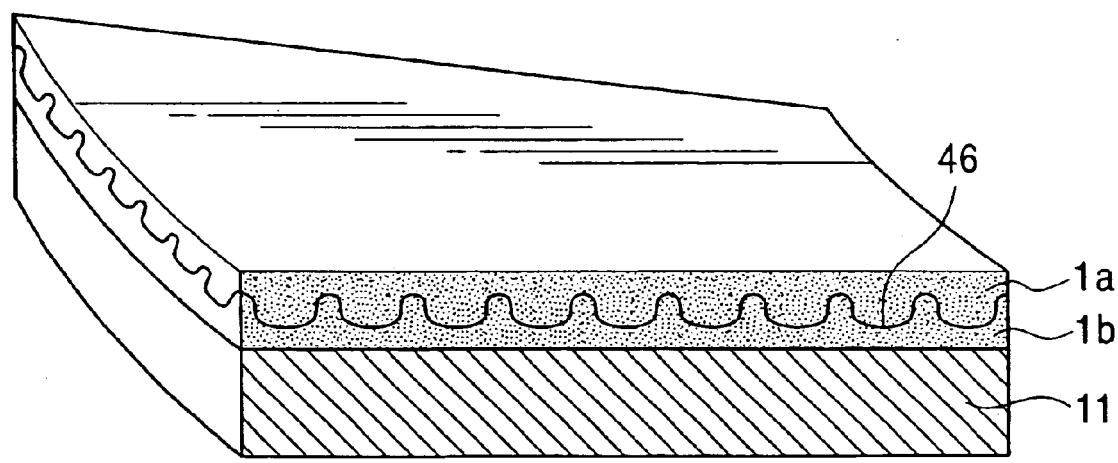
FIG. 18B is a perspective view of a portion of the movable hearth, the solid reductant layer, and the material layer shown in FIG. 18A.
Figure 19A:
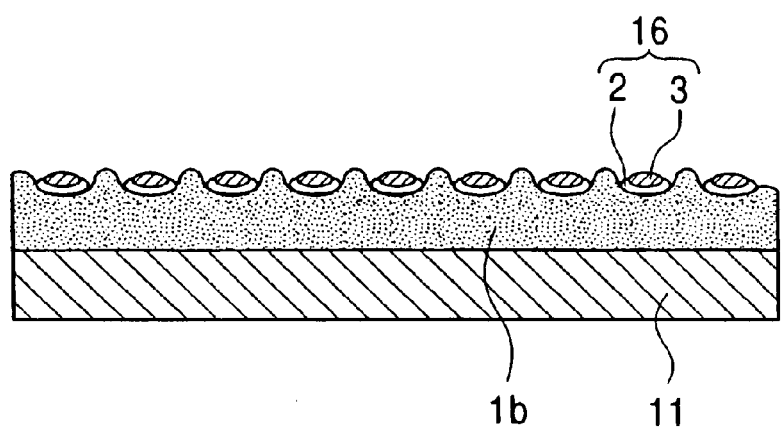
FIG. 19A is a sectional view of a portion of the movable hearth, the solid reductant layer on the movable hearth, and a reduced product on the solid reductant layer.
Figure 19B:
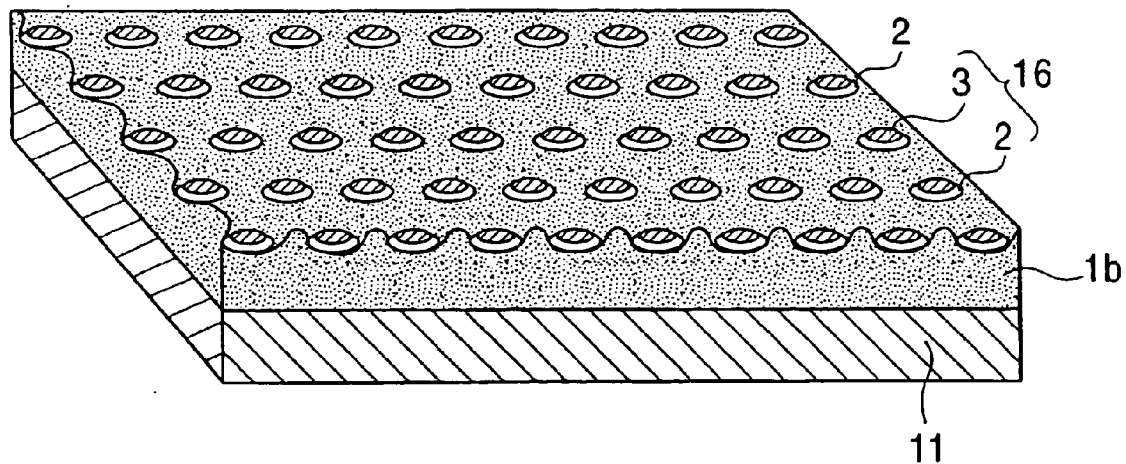
FIG. 19B is a perspective view of a portion of the movable hearth, the solid reductant layer, and the reduced product shown in FIG. 19A.

As shown in FIGS. 18A and 18B, when operating a movable-hearth furnace, a solid reductant layer 1b is formed on a movable hearth 11, a mixed raw material 12 (from FIG. 1) including as major components an iron-containing substance and a solid reductant (mixed solid reducing agent) is deposited to form a raw-material layer 1a on the solid reductant layer 1b, and the raw-material layer 1a is heated by combustion of a burner 13 (from FIG. 1) disposed in an upper part of the movable-hearth furnace, whereby the iron-containing substance in the mixed raw material 12 is reduced by an action of the solid reductant included in the mixed raw material 12, a reduced product 16 (from FIG. 2) including gangue and the like is produced, and ash included in the solid reductant is separated from the solid reductant. In this case, the volume of the reduced product 16 is smaller by far than that of the mixed raw material 12 because the solid reductant is consumed with the reaction, although the difference in volume between the reduced product 16 and the mixed raw material 12 differs according to the method of blending and the composition of the mixed raw material 12. A sub-material which accelerates melting of the reduced product 16 and the ash is added to the mixed raw material 12. The mixed raw material 12 is maintained in a solid state after reduced and until melted although vaporization of crystal water and a decomposition reaction occur (for example, $CaCO_3$ as a major component of a limestone is pyrolyzed to CaO). When the mixed raw material 12 in a solid state is further heated, the iron-containing substance, the ash, and the sub-material start to be melted, and a metal and slag are separated to be produced. In this case, since the mixed raw-material layer 1a which is a mixture of the iron-containing substance and the solid reductant, or the iron-containing substance, the solid reductant, and the sub-material is deposited on the solid reductant layer 1b, a metal 2 and slag 3 shown in FIGS. 19A and 19B are produced to be disposed on the solid reductant layer 1b. The solid reductant layer 1b, although it is an accumulative layer of a reductant, does not include metal-containing substance. Therefore, it does not practically function as a reductant and does not chemically change except for a portion which vaporizes during operation. Generally, the solid reductant includes ash of approximately 10 percent and a carbonaceous substance as a major part for the remaining portion. The solid reductant layer 1b is maintained in a solid state when exposed to a high temperature on the order of 1000 to 1500° C. Therefore, the solid reductant layer 1b does not adhere to a heat-resistive material disposed on the surface of the movable hearth 11, whereby the solid reductant layer 1b can be used as a protective layer for the heat-resistive material.

A plurality of concavities 46 as shown in FIGS. 18A and 18B may be formed in the solid reductant layer 1b, as shown in FIGS. 19A and 19B, and the mixed raw material 12 which forms the raw-material layer 1a is disposed on the solid reductant layer 1b provided with the plurality of concavities 46. When the mixed raw material 12 is reduced and heated, and thereby melted, the melted metal and slag agglomerate in the concavities 46 formed in the solid reductant layer 1b by the effect of surface tension and gravity of the melted metal and slag, whereby the metal 2 with the slag 3 is divided into units in the concavities, as shown in FIGS. 19A and 19B.

Since the melted metal 2 and the slag 3 have a volume percent of only about 10 to 60% of the mixed raw material 12, each unit of the melted metal 2 with the slag 3 agglomerating in the concavity 46 can be separated from the other units formed in adjacent concavities 46. The specific gravities of the melted metal 2 and the slag 3 are generally greater than that of the solid reductant. Therefore, there is a risk that the melted metal 2 and the slag 3 will move into and/or under the solid reductant layer 1b. However, when the mixed raw material 12, which is a mixture of the metal-containing substance and the solid reductant or the sub-material added thereto, and is disposed on the solid reductant layer 1b provided the concavities 46 therein, is reduced and is melted, the melted metal 2 with the slag 3 is agglomerated by being sustained in each of the concavities 46 in the solid reductant layer 1b by the effect of surface tension.

Figure 1:
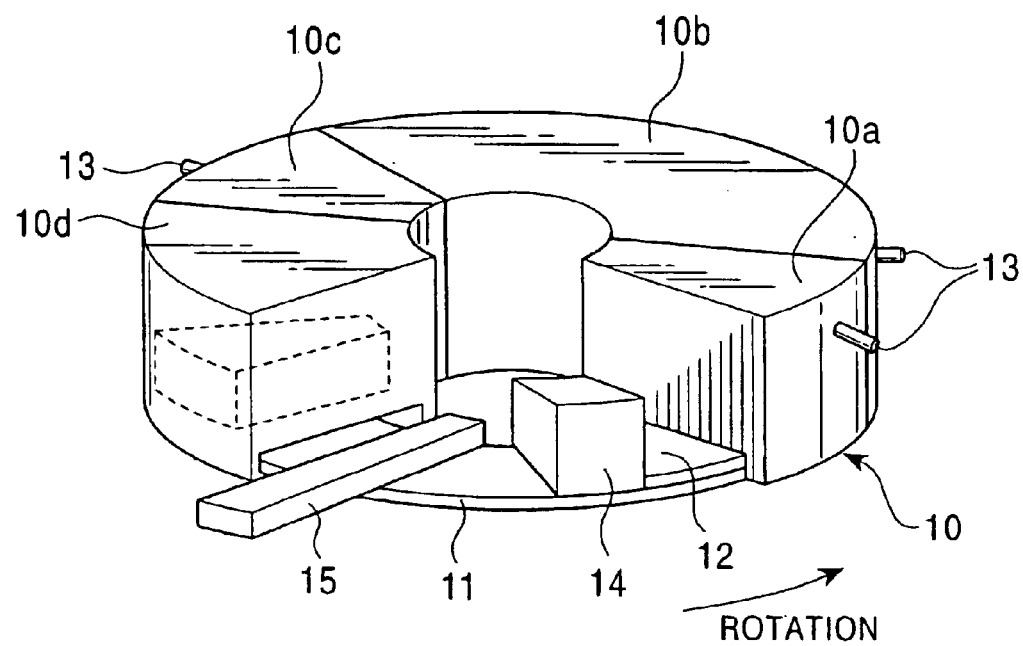
FIG. 1 is a perspective view of a known movable-hearth furnace.
Figure 2:
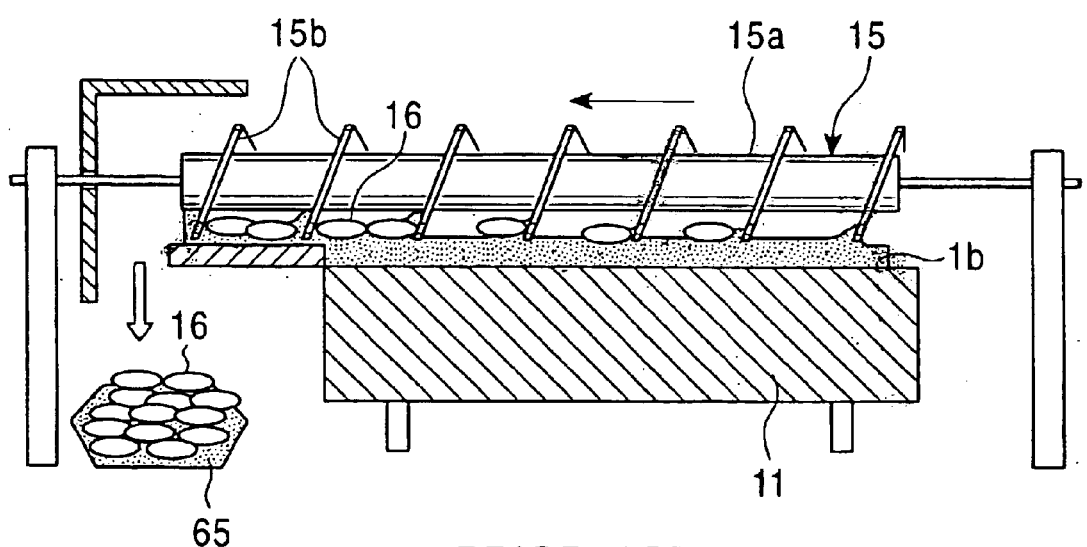
FIG. 2 is a sectional view of a known discharging device.

When the melted metal 2 with the slag 3 separated from the gangue and ash and disposed on the solid reductant layer 1b is cooled in a cooling zone 10d on the movable hearth 11 shown in FIG. 1, and the melted metal 2 with the slag 3 agglomerates in each of the concavities 46. The agglomerated metal 2 with slag 3 in each concavity 46 is maintained to be separated from the movable hearth 11 with the solid reductant layer 1b therebetween.

The grain diameter of the solid reductant included in the solid reductant layer 1b is preferably not larger than approximately 8 mm, because there is a risk that the melted metal 2 and slag 3 will infiltrate the solid reductant layer 1b and reach the heat-resistive material disposed on the hearth 11 when the grain diameter of the solid reductant is larger.

Since the solid reductant in the solid reductant layer 1b on the hearth 11 does not significantly contribute to the reduction reaction, as described above, it is not likely to be oxidized and carburized. Therefore, the solid reductant remaining on the hearth 11 can be recycled. The whole of the solid reductant may be discharged and selected at the outside of the furnace. However, the solid reductant immediately after being discharged is very hot and dangerous because of the risk of fire when being sifted outside the furnace. On the other hand, when the solid reductant is reloaded while it is hot or the solid reductant is left in the furnace, the sensible heat of the solid reductant can be used efficiently. Therefore, the reduced product 16 which has a larger grain size is preferably selectively collected on the hearth 11 of the furnace and the solid reductant having a smaller grain size is preferably left in the furnace to be used as the solid reductant layer 1b.

According to an embodiment of the invention, the reduced product 16 including reduced iron pellets, metals, and slag is attracted and removed from the movable hearth 11 by using a magnetic force of a magnet, and is transferred and discharged to the outside of the furnace for collection. Because the reduced product 16 produced on the movable hearth 11 is attracted and lifted, thereby removing it from the surface of the movable hearth 11, by using a magnet, the reduced product 16 can be discharged smoothly without scratching the heat-resistive material on the movable hearth as in known methods. Because a magnet is used, only a metal with slag attracted to the magnet can be selectively discharged even when the metal with slag is produced by the technology disclosed in, for example, Japanese Unexamined Patent Application Publication No. 11-172312, and the solid reductant which is not affected by the magnetic force of the magnet can be completely left on the hearth 11 except for a very small portion of the solid reductant adhered to the metal and slag. The solid reductant can be reused with the raw materials loaded thereon in the subsequent step.

A method for discharging the reduced product from the movable-hearth furnace according to the invention is described below.

Figure 3:
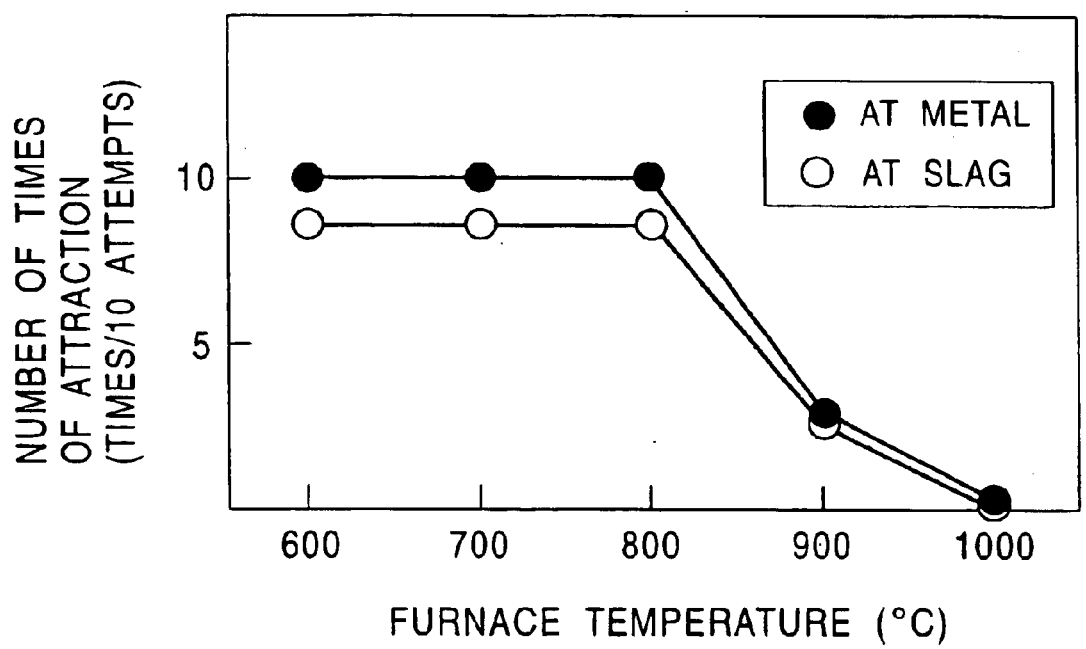
FIG. 3 is a graph showing the relationship between the number of times of attraction and the temperature of reduced iron.
Figure 4:
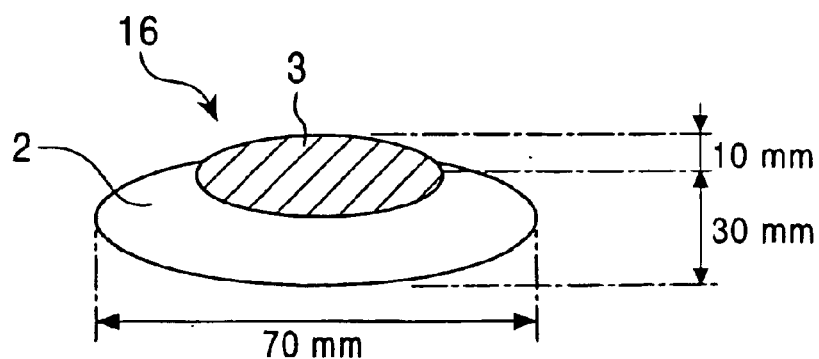
FIG. 4 is an illustration of reduced iron as a reduced product.

The magnetization of iron decreases at high temperature. In particular, it is known that iron has substantially no magnetism at a temperature above the Curie point. We performed a test in which the manufactured reduced product 16 was heated in an electric furnace and attracted by a magnet at different temperatures. In the test, the reduced product 16 was brought into contact with a magnet of 0.1 T ten times for two seconds per contact. The number of times at which the reduced product 16 was attracted by the magnet are shown in FIG. 3. A representative illustration of the reduced product 16 which was used in the test is shown in FIG. 4. The reduced product 16 including the metal 2 with the slag 3 having a grain size approximately the same as the largest grain size of a reduced product generally produced by a movable-hearth furnace was used because the reduced product having a smaller size could be more easily attracted. The reduced product 16 was attracted several times at a furnace temperature of 900° C., as shown in FIG. 3. The fact may be because the surface temperature of the reduced product 16 which was reduced iron decreased due to the magnet, which was at room temperature, coming into contact with the reduced product 16 in the furnace, whereby the reduced iron was magnetized in the vicinity of the surface thereof and the attraction was possible even when the furnace temperature was above the Curie point.

The reduced iron can be attracted by decreasing the temperature of the magnet below the Curie point. It is apparent that at least the reduced product 16 is preferably cooled.

Figure 5:
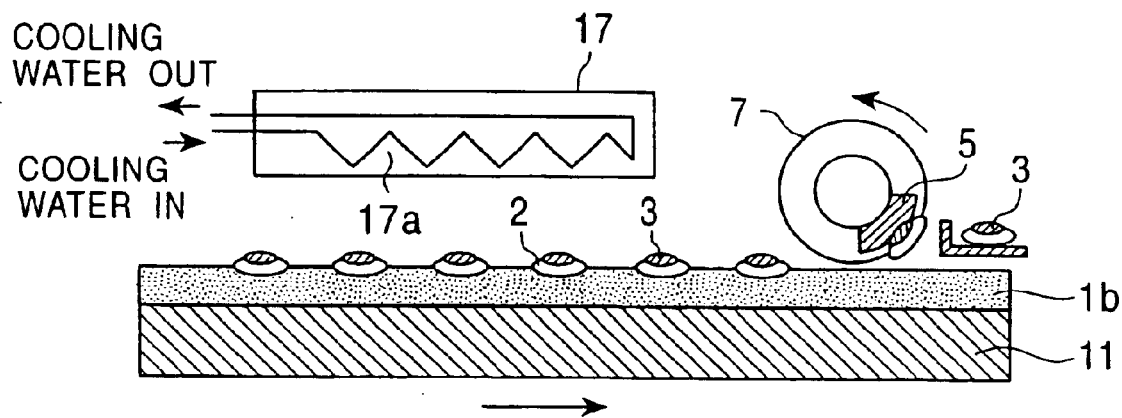
FIG. 5 is a sectional view showing a method for cooling the reduced iron by using a cooling plate.
Figure 6:
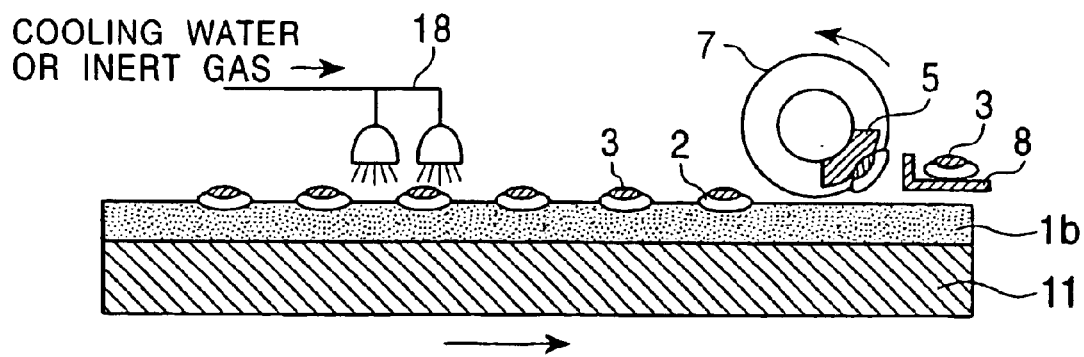
FIG. 6 is a sectional view showing a method for cooling the reduced iron by spraying water.
Figure 7:
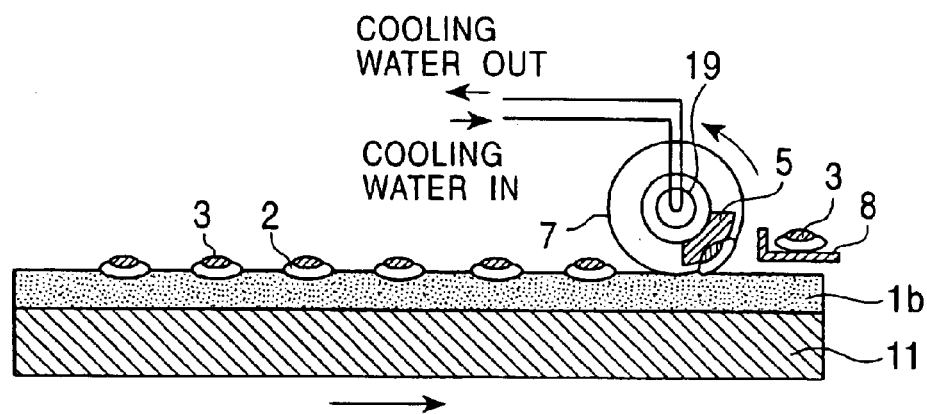
FIG. 7 is a sectional view showing a method for directly cooling the reduced iron.

The temperature of the reduced product 16 is decreased in such a preferable manner that the reduced product 16 is cooled to a proper temperature before a magnetic field is applied to the reduced product 16. For example, a cooling plate 17 mounted therein with a cooling pipe 17a is provided at an upper part of the hearth 11, and the reduced product is cooled by heat radiation to the cooling plate 17, as shown in FIG. 5. In FIG. 6, a coolant-dispersing device 18 sprays water, an inert gas, or the like for cooling from above the hearth 11. In FIG. 7, a cooling drum 19 is provided for directly cooling the reduced iron, which is advantageous because the reduced iron which has higher thermal conductivity than slag or solid reductant can be selectively cooled. However, although it is advantageous that the reduced iron can be selected by attraction to be collected by decreasing the temperature of the reduced iron for collection, there is a problem in that heat loss is unnecessarily increased, thereby reducing the thermal efficiency of the furnace. The magnetic force is effective to the reduced product 16 which is reduced iron even when the temperature thereof is in a range of not lower than the Curie point (approximately 800° C.) and not higher than about 900° C.

Figure 13:
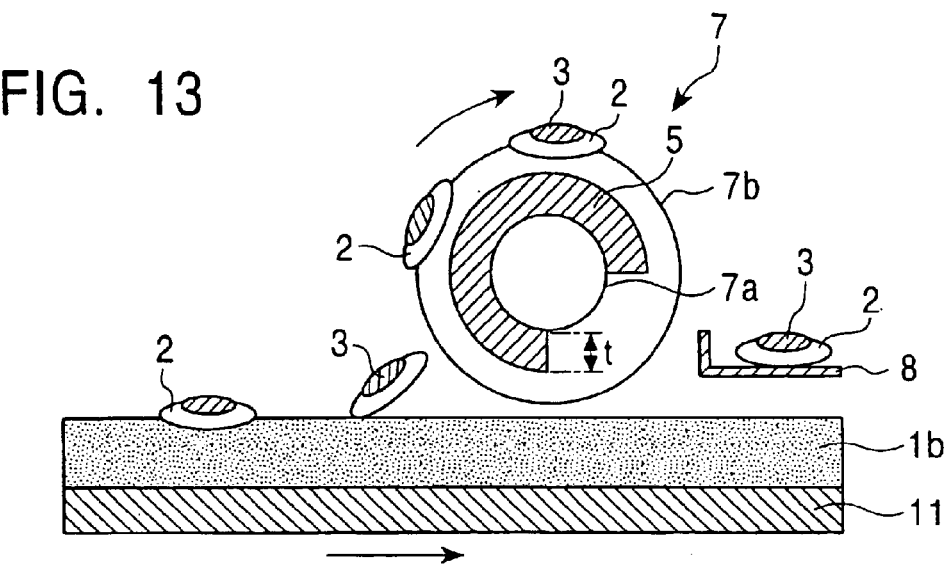
FIG. 13 is an illustration of a rotary drum provided with magnets disposed along ¾ of the periphery of the rotary drum, rotating in a direction opposite to the movement of a movable hearth.

Another test was performed to study the effect of the slag 3 adhered to the metal 2. In that test, the effect of the slag 2 on attraction when the metal 2 of the reduced product 16 was disposed upward was confirmed. As a result, when the metal 2 was upwardly disposed (see FIG. 13), the reduced product 16 could be collected at a high collection rate. It was believed that the attractive force increased with the metal 2 being directly in contact with a magnet 5. Therefore, it is desirable that the distance between the magnet 5 and the metal 2 of the reduced product 16 is reduced to a minimum, thereby increasing the attractive force. Therefore, the magnet 5 is preferably held substantially vertically movable so that the distance can be controlled.

The discharging method and the discharging device according to the present invention are further described below in detail with reference to the drawings.

Figure 8:
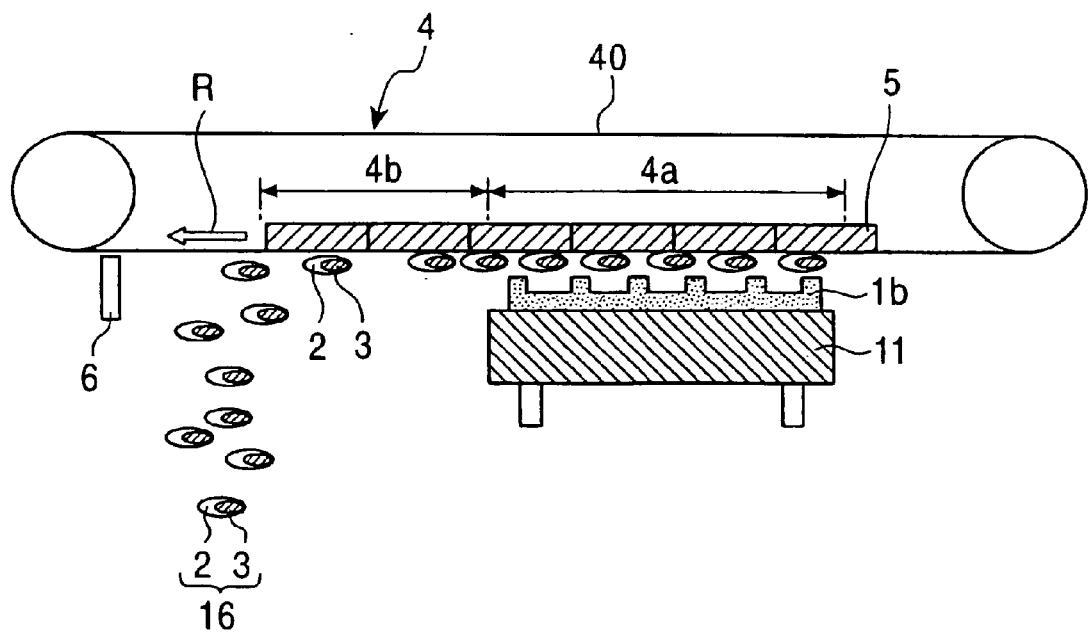
FIG. 8 is an illustration of a discharging device according to the invention.

FIG. 8 shows a discharging device according to the invention. The discharging device discharges the reduced product 16 including the metal 2 and the slag 3 formed on the solid reductant layer 1b. The discharging device shown in FIG. 8 includes as a major component a belt conveyor 4 which is disposed above the movable hearth 11 and of which the transfer direction is substantially perpendicular to the direction of movement of the movable hearth 11, the belt conveyor 4 extending to the outside of the furnace. The belt conveyor 4 is provided with a magnet 5 at a position 4a opposing the movable hearth 11 and at a position 4b disposed outside the furnace and adjacent the position 4a, the magnet 5 serving to generate a magnetic force for attracting the reduced product 16 including the metal 2 and the slag 3 produced on the movable hearth 11. The magnet 5 is affixed above the movable hearth 11 to oppose the same with a belt 40 of the belt conveyor 4 therebetween.

When the belt 40 of the belt conveyor 4 shown in FIG. 8 is driven in a direction R, the reduced product 16 including the metal 2 and the slag 3 produced on the solid reductant layer 1b is attracted to the belt 40 by the magnetic force of the magnet 5, whereby the reduced product 16 is separated from the movable hearth 11, is adhered to the belt 40, and is moved with the belt 40 in the rotational direction. The metal 2 and the slag 3 are attracted and adhered to the belt 40 at least at the position 4a opposing the movable hearth 11 and the position 4b outside the furnace.

The metal 2 and the slag 3, which have been transferred with the movement of the belt 40 to a region outside the furnace in which the magnet 5 is not provided, fall down by their own weight because the attractive force of the magnet 5 is discontinued or not applied outside of the furnace. Thus, the metal 2 and the slag 3 on the movable hearth 11 are raised from the movable hearth 11 by the magnet 5, and are transferred and discharged to the outside of the furnace.

A material which transmits a magnetic force, such as a typical rubber belt, an austenitic stainless steel, or the like may be used for the belt conveyor 4 described above. In particular, when a metallic belt made of a material, such as an austenitic stainless steel is used, the reduced product 16 can be removed from the movable hearth 11 by using a magnetic force when the temperature of the reduced product 16 decreases below the Curie point, although not too near room temperature, at which temperature iron included in the reduced product 16 has high magnetism. Therefore, in ordinary manufacture of reduced iron, the reduced product 16 can be discharged at a temperature ranging from about 500 to about 600° C. That is, costs of energy can be reduced when sensible heat is collected from a product at the outside of the furnace or the product is melted in the subsequent process.

The discharging device described above is preferably provided with a scraping plate 6 at the downstream side, from the region in which the magnet 5 is disposed, in the direction of transfer by the belt conveyor 4, the scraping plate 6 being for removing the metal 2 and the slag 3 adhering to the belt 40.

The magnet 5 may be either a permanent magnet or an electromagnet and may consist of multiple smaller magnets. The strength of magnetic force of the magnet 5 may be appropriately set according to the characteristics of the metal and slag to be produced and the distance between the belt conveyor 4 and the surface of reductant layer 1b. In particular, the strength of magnetization of the magnet 5 and the height of the conveyor 4 are controlled for each installation so that the magnetic flux density is on the order of about 0.1 to about 0.2 T at the surface of the belt conveyor 4, and are set according to the discharged state of the product. When using an electromagnet as the magnet 5, an appropriate discharge condition can be determined by controlling the current applied to the electromagnet.

Figure 9:
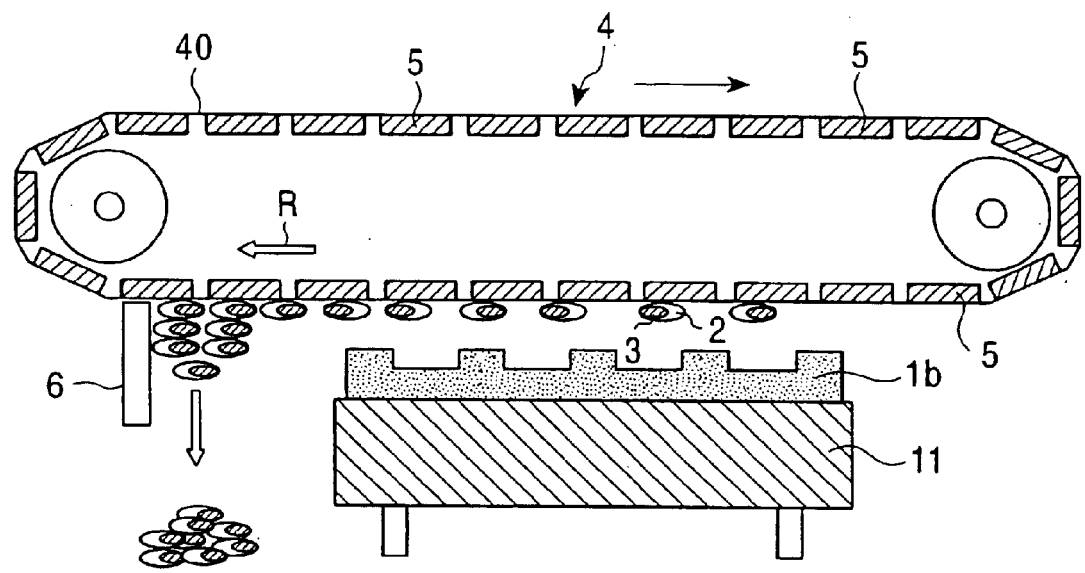
FIG. 9 is an illustration of the discharging device according to the invention.

A discharging device shown in FIG. 9 includes magnets 5 mounted on the entire rear face of the belt 40 of the belt conveyor 4. In the discharging device, the metal 2 and the slag 3 adhering to the front face of the belt 40 are scraped by the scraper 6 at the outside of the furnace. The belt 40 and the magnet 5 of the discharging device shown in FIG. 9 are basically the same as those of the discharging device shown in FIG. 8.

Figure 10:
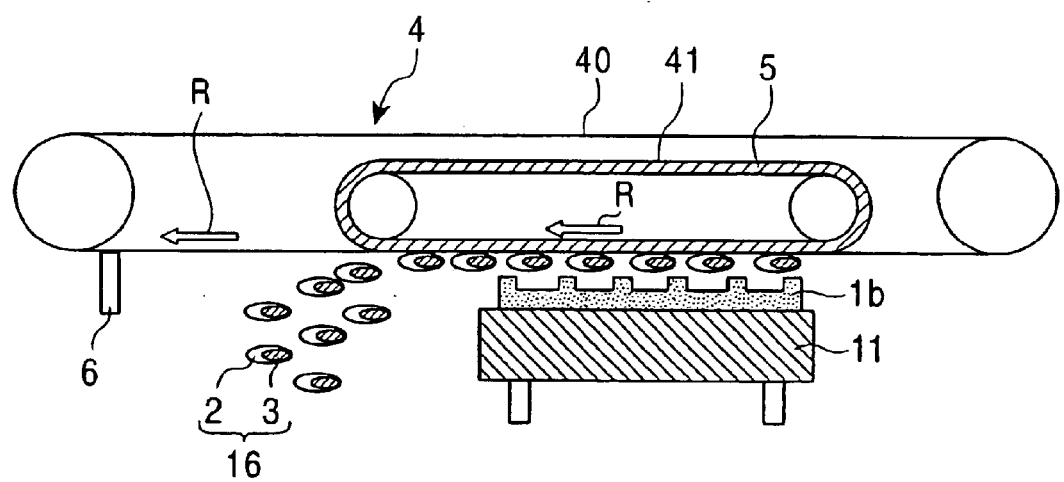
FIG. 10 is an illustration of the discharging device according to the invention.

A discharging device shown in FIG. 10 differs from the discharging device shown in FIG. 8 which is provided with the magnet 5 in the vicinity of a lower belt of the belt conveyor 4, in that a built-in belt conveyor 41 is provided between upper and lower belts of the belt conveyor 4 to oppose the movable hearth 11 and move in the widthwise direction of the movable hearth 11, the built-in belt conveyor 41 being provided with magnets 5 directly fixed to the inner face of a belt of the built-in belt conveyor 41. The built-in belt conveyor 41 is driven substantially at the same speed as and synchronized with the belt conveyor 4 which encloses the built-in belt conveyor 41. The metal 2 and the slag 3 on the movable hearth 11 are attracted by the magnets 5 mounted to the rear face of the built-in belt conveyor 41, in the same manner as shown in FIG. 8, are transferred by being attracted to a belt 40 of the belt conveyor 4, and are discharged to the outside of the furnace, as shown in FIG. 10.

In the discharging device shown in FIG. 10, the belt 40 is not necessarily made of a stainless steel even when the reduced product 16 is hot, and it may be an ordinary metallic belt. When a steel belt which is attracted by a magnet is used in the discharging device shown in FIG. 8, the belt conveyor 4 cannot smoothly operate due to the attraction between the steel belt and the magnet 5. On the other hand, in the discharging device shown in FIG. 10, the belt conveyor 4 can operate smoothly because the magnets 5 and the steel belt move at the same speed as each other.

Although in the discharging device according to the embodiments described above, the reduced product 16 which is discharged from the movable hearth 11 includes the metal 2 and the slag 3, the reduced product 16 may include reduced iron pellets. In the discharging device to be described below, the reduced product 16 may also include the reduced iron pellets.

Figure 11:
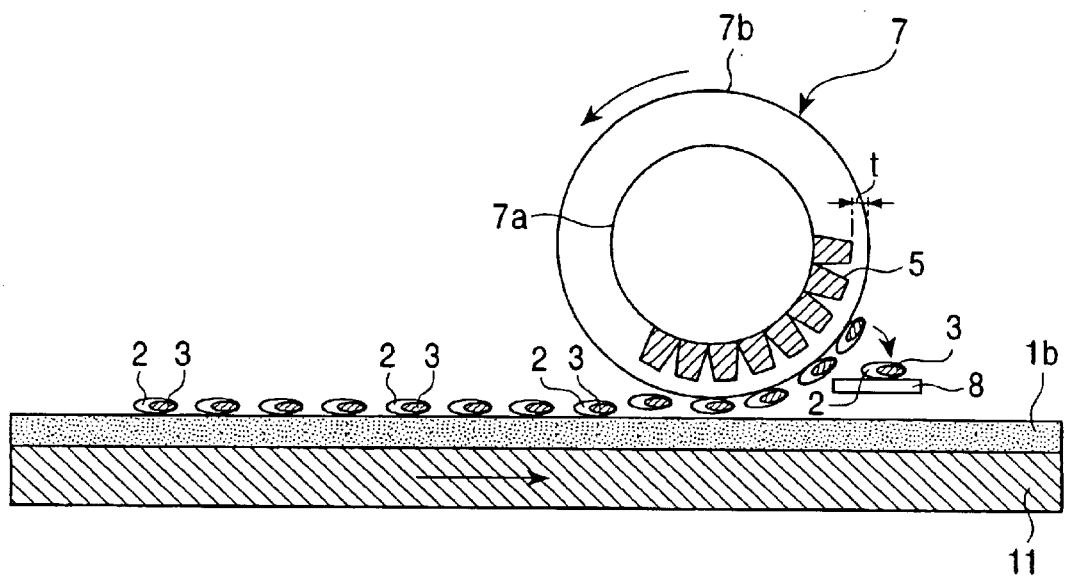
FIG. 11 is an illustration of the discharging device according to the invention.

Although the discharging device according to the above-described embodiments uses a belt conveyor, a discharging device according to another embodiment of the present invention uses a rotary drum provided with magnets, as shown in FIG. 11. The discharging device is provided as a major component with a rotary drum 7 which spans the movable hearth 11. The rotary drum 7 is mounted with magnets 5 at least in one part of the rotary drum 7 opposing the movable hearth 11.

Figure 12:
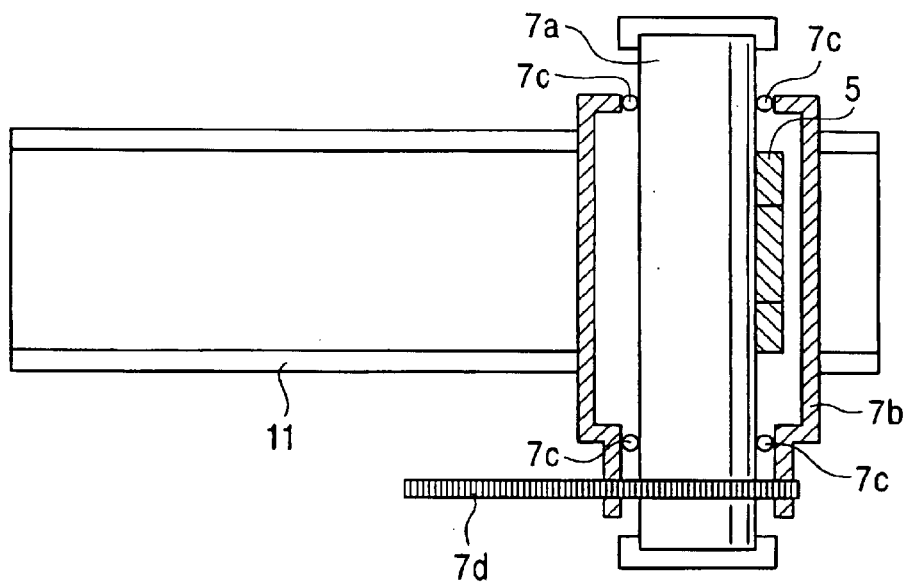
FIG. 12 is an illustration of the discharging device shown in FIG. 11, according to the invention.

As shown in FIGS. 11 and 12, the rotary drum 7 includes a cylindrical inner roller 7a provided with the magnets 5 fixed to the outer face of the inner roller 7a, and an outer drum 7b which is rotatable coaxially with the inner roller 7a and is separated from the inner roller 7a via bearings 7c, the inner roller 7a being disposed inside the outer drum 7b. The outer drum 7b rotates in the direction of movement of the movable hearth 11. In FIG. 12, a drive chain 7d rotates the outer drum 7b.

The reduced product 16 including a metal and the like which is attracted by the magnets 5 and is removed from the movable hearth 11 is transferred by a transfer conveyor 8 and collected at the outside of the furnace. The magnets 5 are fixed to the outer face of the inner roller 7a in a part of the rotary drum 7 opposing the movable hearth 11, toward an intermediate part of the inner roller 7a from a lower part thereof. The transfer conveyor 8 is disposed in parallel to the axis of the rotary drum, and which receives the reduced product attracted to and falling from the rotary drum, and extends from the movable hearth to the outside of the movable-hearth furnace. The transfer conveyor 8 includes a belt conveyor for discharge, which extends from the movable hearth 11 to the outside of the furnace.

When the rotary drum 7 rotates in a direction opposite to the direction of movement of the movable hearth 11, the magnets 5 are preferably mounted to approximately ¾ of the area of the outer face of the cylindrical inner roller 7a in a rotational direction of the rotary drum 7. The reduced product 16, which is attracted to the outer drum 7b and revolves about the inner roller 7a, falls down onto the transfer conveyor 8 because the magnetic force ceases to be applied to the reduced product 16 above the transfer conveyor 8.

By thus appropriately setting the temperature of the reduced product 16 and the position of the magnets 5, the maximum strength of magnetic field applied to the rotary drum 7 can be decreased, whereby it is not necessary to use a costly magnet such as a superconducting magnet, thereby reducing the manufacturing cost of the discharging device.

The rotational direction of the rotary drum 7 is preferably opposite to the direction of movement of the movable hearth 11. With the rotary drum 7 rotating in a direction opposite to the direction of movement of the movable hearth 11, the reduced product 16 once attracted to the rotary drum 7 and removed therefrom can be collected by being brought again into contact with the rotary drum 7, whereby the efficiency in collection can be improved.

The outer drum 7b is preferably positioned to have a clearance t (t=10 to 20 mm) from the magnets 5 which are fixed to the inner roller 7a, so as not to come into contact with the magnets 5. The metal 2 and the slag 3 produced on the movable hearth 11 are removed from the movable hearth 11, attracted to the surface of the outer drum 7b by a magnetic force, transferred in the rotational direction of the outer drum 7b, separated from the surface of the outer drum 7b by their own weight when they reach a portion in which the magnets 5 are not provided, and fall down onto the transfer conveyor 8.

The transfer conveyor 8 is a belt conveyor which circulates along the axis of the outer drum 7b and in a direction substantially perpendicular to the direction of movement of the movable hearth 11 and transfers the reduced product 16 to the outside of the furnace. The belt conveyor may be an ordinary rubber belt or a heat-resistive metallic belt when it is used when the temperature of the reduced product 16 is high.

The inner roller 7a must only have strength enough for affixing the magnets 5 on the surface thereof, and the material for the inner roller 7a is not limited to a particular material. The outer drum 7b which transmits a magnetic force and rotates is preferably made of a non-magnetic metal such as an austenitic stainless steel. The outer drum 7b may be provided with a friction-resistive liner on the surface thereof.

The magnets 5 may be either permanent magnets or electromagnets. A magnetic flux density of approximately 0.2 T at the surface of the outer drum 7b is required. The magnetic strength of the magnets 5 and the distance between the surface of the outer drum 7b and the substances on the movable hearth 11 to be attracted may be controlled for each installation and determined in accordance with the discharged state of the product.

Figure 14:
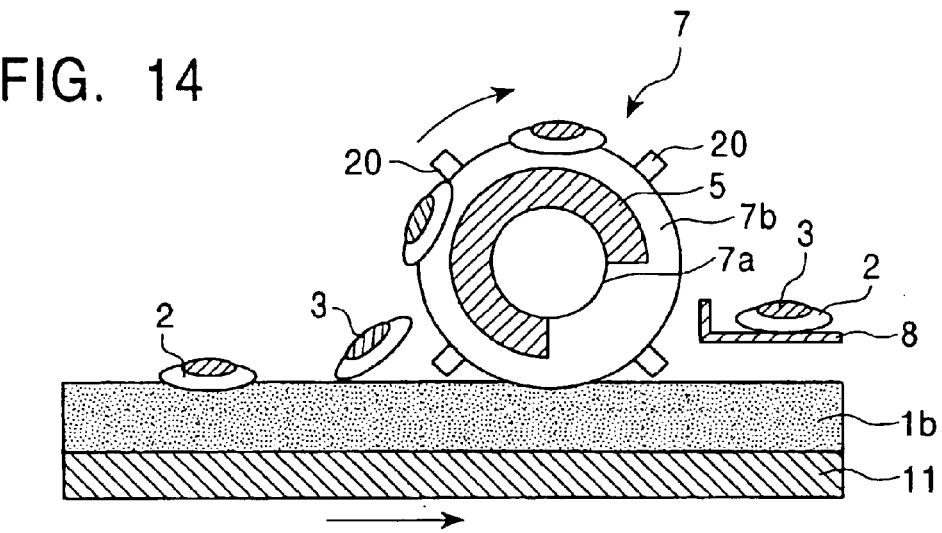
FIG. 14 is an illustration of the rotary drum provided with protrusions for scraping.
Figure 17A:
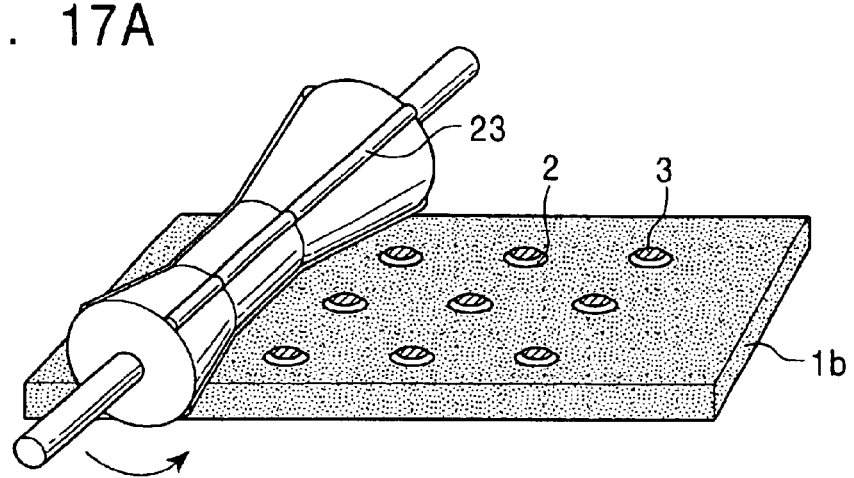
FIG. 17A is a perspective view of a drum having a smaller diameter in a longitudinally intermediate part thereof.
Figure 17B:
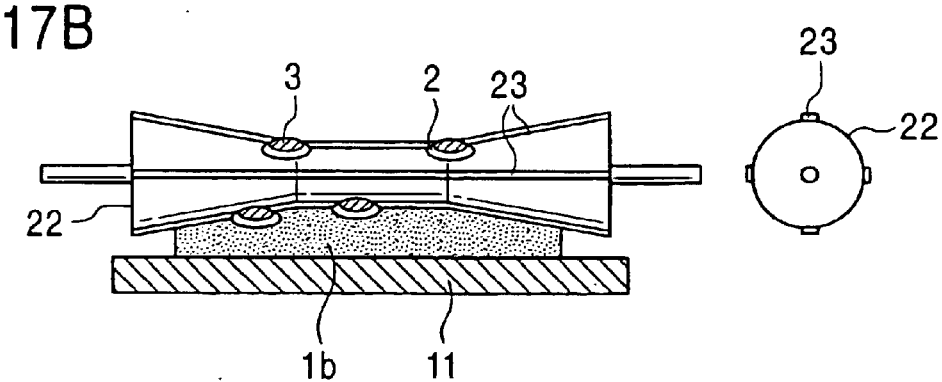
FIG. 17B includes sectional views of the drum shown in FIG. 17A.

The reduced product 16 attracted to the surface of the outer drum 7b at a portion thereof associated with the magnets 5 is not likely to be removed therefrom. In order to avoid this phenomenon, a plurality of protrusions 20 or 23 are preferably provided on the peripheral surface of the outer drum 7b, as shown in FIG. 14 or FIGS. 17A and 17B, respectively, whereby the attracted metal 2 and the like become easy to be removed from the surface of the outer drum 7b. Moreover, the reduced product 16 disposed on the movable hearth 11 is turned over by the protrusions 20 or 23 and the metal 2 included in the reduced product 16 faces upward, whereby the magnetic force of the magnets 5 can be used effectively, as shown in FIG. 3, thereby further improving collection efficiency.

Figure 15:
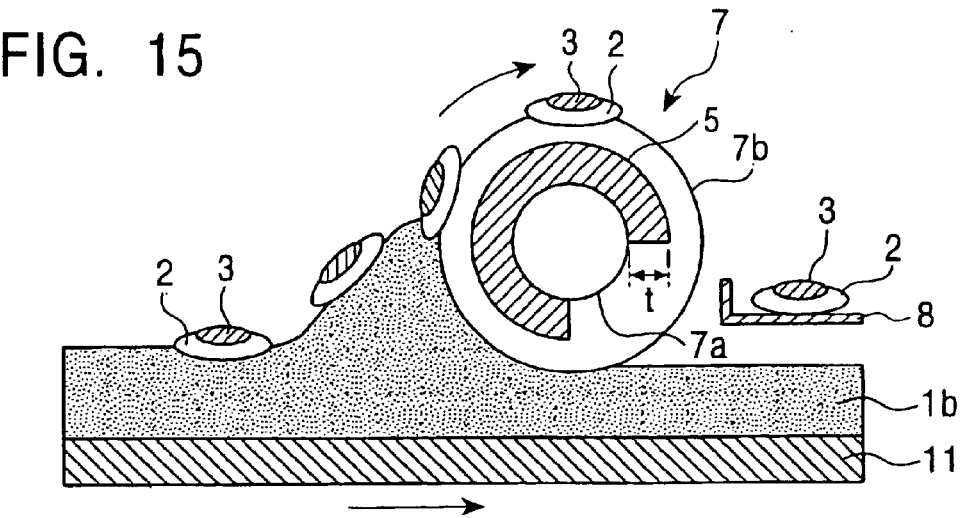
FIG. 15 is an illustration showing a state in which discharge is not performed smoothly.

The rotary drum 7 may be brought into contact with the solid reductant layer 1b for collection of the metal 2 and the like when the rotary drum 7 including the magnets 5 is sufficiently cooled. However, there is a risk that solid reductant from the solid reductant layer 1b not to be discharged is accumulated at the leading side of the rotary drum 7 by the resistance of the rotary drum 7, thereby blocking the operation of the rotary drum 7, when the rotary drum 7 without the protrusions 20 and 23 are pressed into a layer of raw materials, as shown in FIG. 15.

Figure 16:
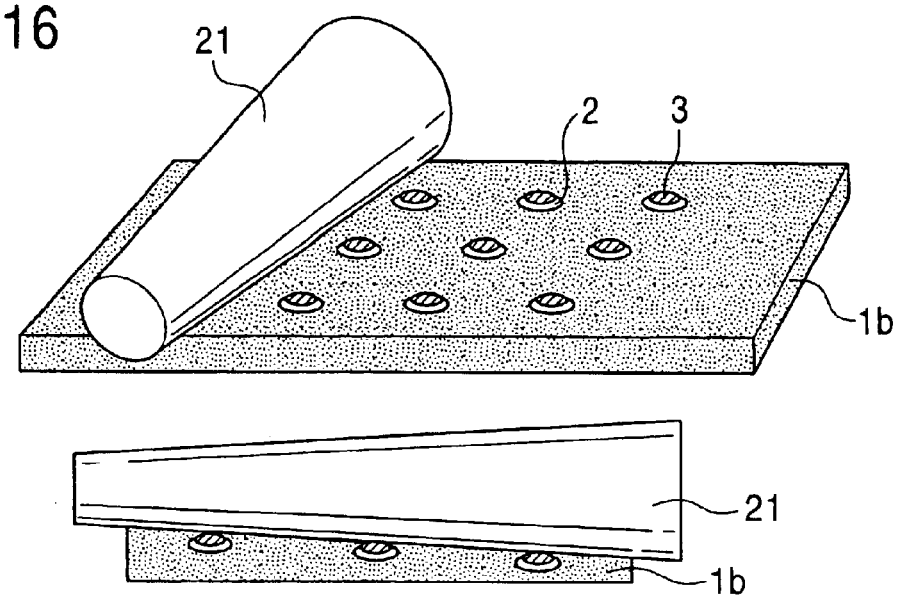
FIG. 16 includes illustrations of a tapered drum.

Accordingly, in order to solve the above problem, a rotary drum 21 having a tapered cylindrical body according to another embodiment of the invention is provided, as shown in FIG. 16. With this arrangement, the solid reductant layer 1b as a solid-reductant-accumulated layer pressed by the tapered cylindrical surface of the rotary drum 21 moves toward the side at which the diameter of the rotary drum 21 is smaller as long as a gap large enough for the solid reductant layer 1b to pass through is provided between the movable hearth 11 and the rotary drum 21, whereby the solid reductant layer 1b can be prepared without deformation thereof for raw materials to be charged in the subsequent step.

Since the solid reductant included in the solid reductant layer 1b is reused on the movable hearth 11, the reductant layer 1b is preferably left as it was used in the preceding step. However, the solid reductant layer 1b is deformed when the reduced product 16 such as reduced iron (metal) and the like is collected, whereby the raw-material layer 1a is deformed and, sometimes, the solid reductant falls from the movable hearth 11.

A modified example of the above-described rotary drum 21 having a tapered cylindrical body is shown in FIGS. 17A and 17B. The modified example includes a roller 22 having a smaller diameter at a longitudinally intermediate part thereof. With this arrangement, the solid reductant of the solid reductant layer 1b moves toward an intermediate part in the widthwise direction of the movable hearth 11 so that the solid reductant layer 1b becomes thicker at the widthwise intermediate part thereof, whereby the deformation of the solid reductant layer 1b can be reliably avoided. The function of the protrusions 23 of the modified rotary drum 21 is the same as that of the protrusions 20 of the rotary drum 7 shown in FIG. 14.

According to another embodiment of the invention, a method for classifying a reduced product according to its grain size and discharging the reduced product having a larger grain size to the outside of a furnace for collection by using a device is described below.

The grain size of the metal 2 and slag 3 is larger than the grain size of the solid reductant included in the solid reductant layer 1b, as described above. Therefore, separation of the metal 2 (reduced iron) and slag 3 from the solid reductant included in the solid reductant layer 1b according to the grain size is made possible.

Therefore, the metal 2 and slag 3 as a product preferably have a grain size not smaller than about 10 mm. Generally, the grain size of a metal with slag becomes about 10 mm or larger by the effect of surface tension when the metal and slag agglomerate in a movable-hearth furnace. However, since the grain size of the metal with slag is sometimes not likely to become about 10 mm or larger only by depositing and melting raw materials, the concavities 46, described above, each having a diameter of not less than about 10 mm are provided in the solid reductant layer 1b such that the metal with slag has a grain size of not less than about 10 mm.

The metal with slag having a smaller grain size and not capable of being separated from the solid reductant are left on the hearth and heated and melted together with the raw materials charged in the subsequent step, and can be collected as the reduced product 16 having a larger grain size.

Figure 20A:
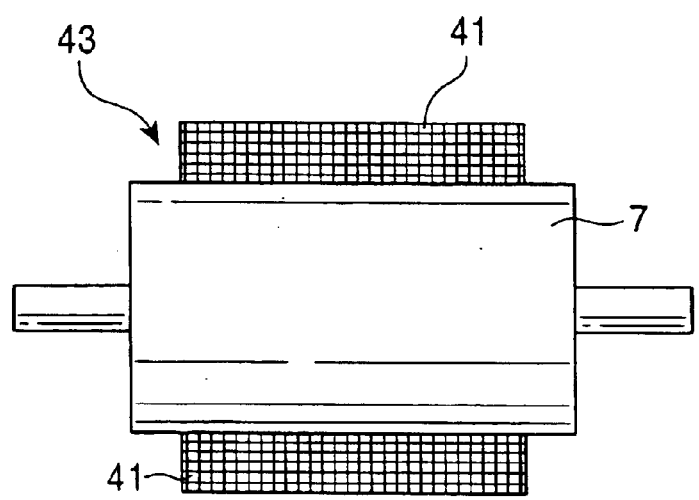
FIG. 20A is an illustration of a selector used in the discharging device according to the invention.
Figure 20B:
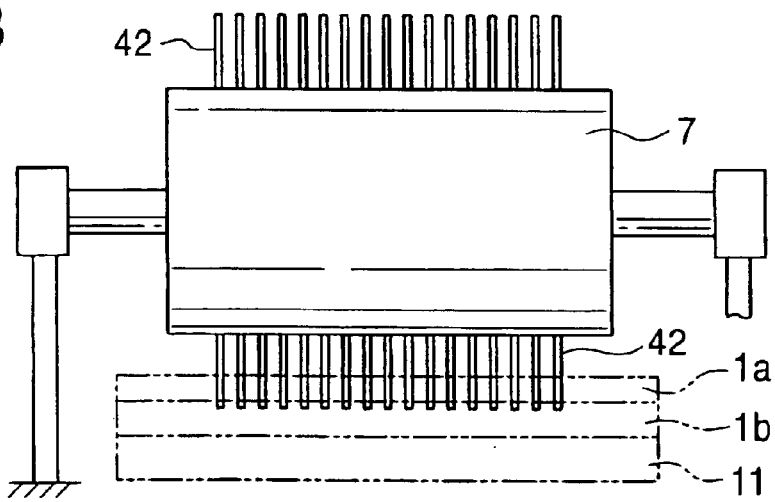
FIG. 20B is an illustration of another selector used in the discharging device according to the invention.
Figure 20C:
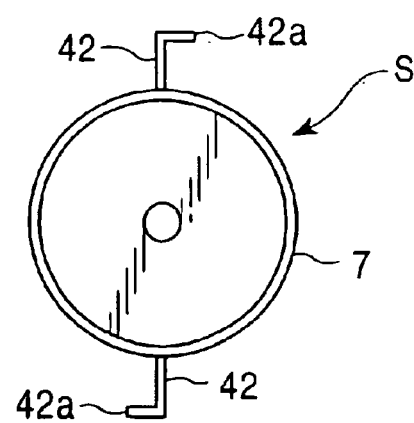
FIG. 20C is a cross-sectional view of the selector shown in FIG. 20B.

The device to be used in the discharging method is described below. The device includes a selector and a transfer conveyor. A selector S is shown in FIGS. 20A, 20B, and 20C, of which a major component is the rotary drum 7. The rotary drum 7 spans the movable hearth 11 at a discharge section thereof positioned at the downstream side of a cooling zone 10d of the furnace. The rotary drum 7 is provided with a plurality of net-shaped screens 41 or comb-shaped screens 42, each protruding radially outwardly from the rotary drum 7 from the periphery thereof. With the rotation of the rotary drum 7, the screens 41 or 42 scoop only the reduced product 16 including metal, slag, and reduced pellets having a larger grain size of, for example, not smaller than about 5 mm from the reduced product 16 scattered on the solid reductant layer 1b on the movable hearth 11, and leave the solid reductant 65 having a smaller grain size on the hearth 11.

Figure 21A:
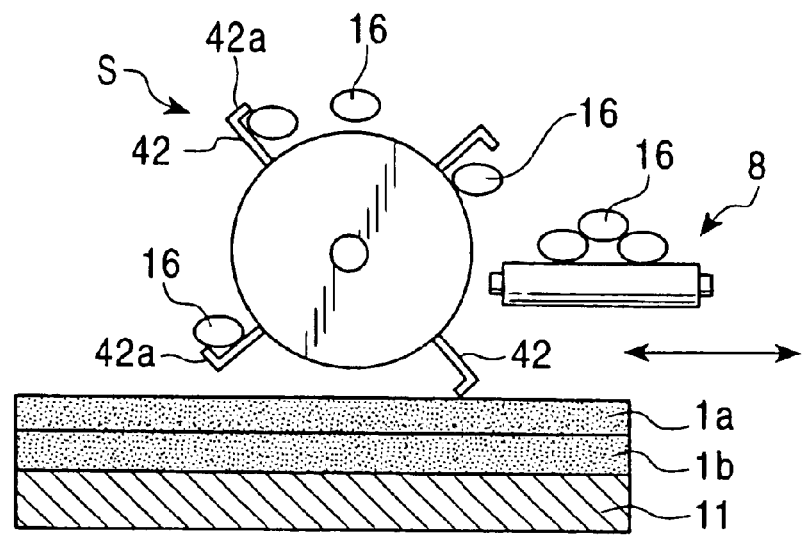
FIG. 21A is an illustration of a discharging device according to an embodiment of the invention.
Figure 21B:
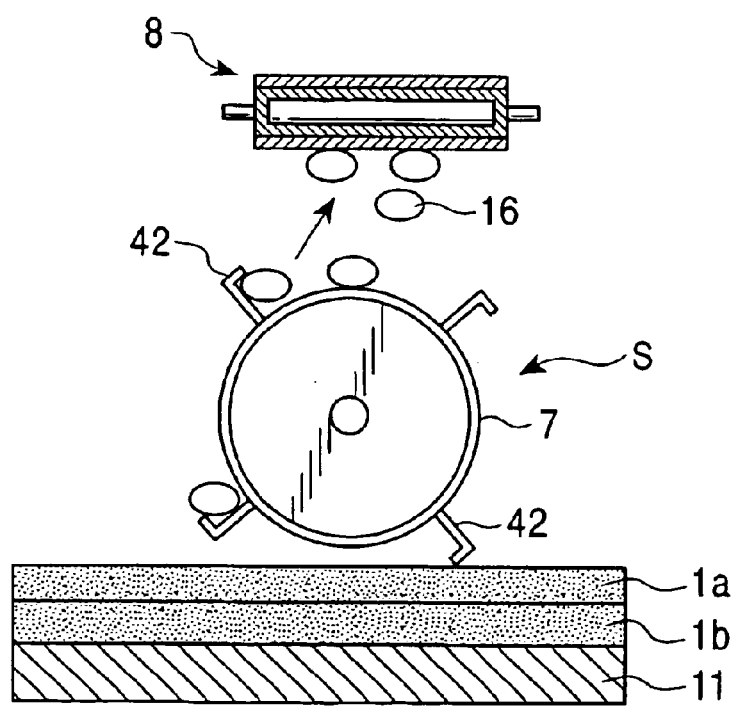
FIG. 21B is an illustration of a discharging device according to another embodiment of the invention.

Each screen 41 or 42 is preferably provided with a hook 42a, which is bent or oriented toward the leading side of the rotation, at an end (the free end) of the screen 41 or 42. FIGS. 21A and 21B show the selector S in operation. The transfer conveyor 8 is provided adjacent the selector S for discharging the reduced product 16 to the outside of the furnace. FIG. 21A shows the transfer conveyor 8 movable in a substantially horizontal direction. FIG. 21B shows the transfer conveyor 8 provided with magnets.

The transfer conveyor 8 shown in FIG. 21A is movable along arrows shown in the drawing to avoid interference with the screens 42, the transfer conveyor 8 moving substantially horizontally synchronized with the position of the screens 42. That is, when the reduced product 16 falls down from one of the screens 42, as shown in FIG. 21A, the transfer conveyor 8 is positioned in the vicinity of the rotary drum 7 to receive the falling reduced product 16. When the screen 42 revolves to a position at which it interferes with the transfer conveyor 8, the transfer conveyor 8 moves to the right in the drawing so that interference is avoided.

The transfer conveyor 8 shown in FIG. 21B is provided with magnets disposed on the rear face of the transfer conveyor 8. When the reduced product 16 scooped by the screen 42 reaches an upper part of the rotary drum 7, the reduced product 16 is attracted to the transfer conveyor 8 by the magnets provided on the rear face of the transfer conveyor 8, and discharged to the outside of the furnace with the operation of the transfer conveyor 8. In this case, the rotary drum 7 is made of a paramagnetic material such as an austenitic stainless steel such that the rotary drum 7 is not affected by the magnetic force.

Figure 22:
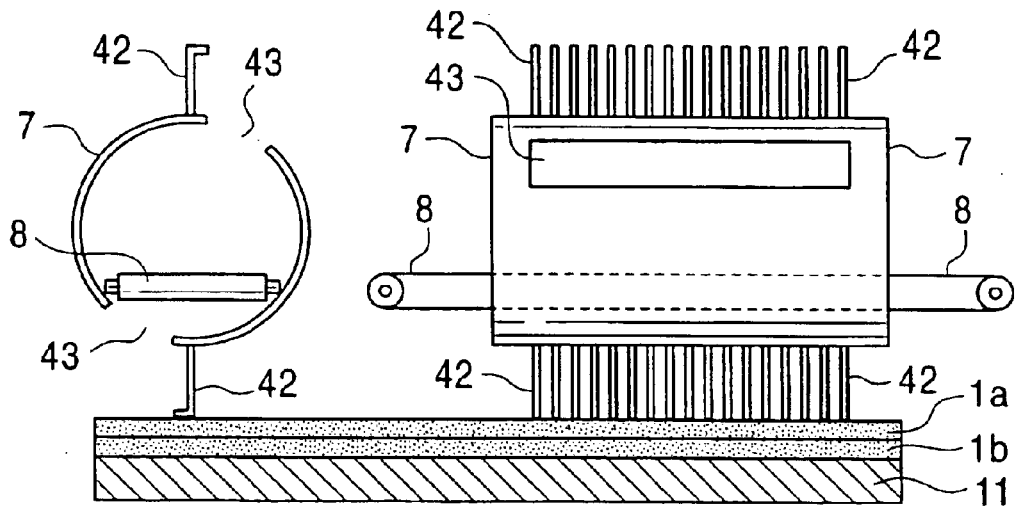
FIG. 22 is an illustration of a discharging device according to another embodiment of the invention.
Figure 23:
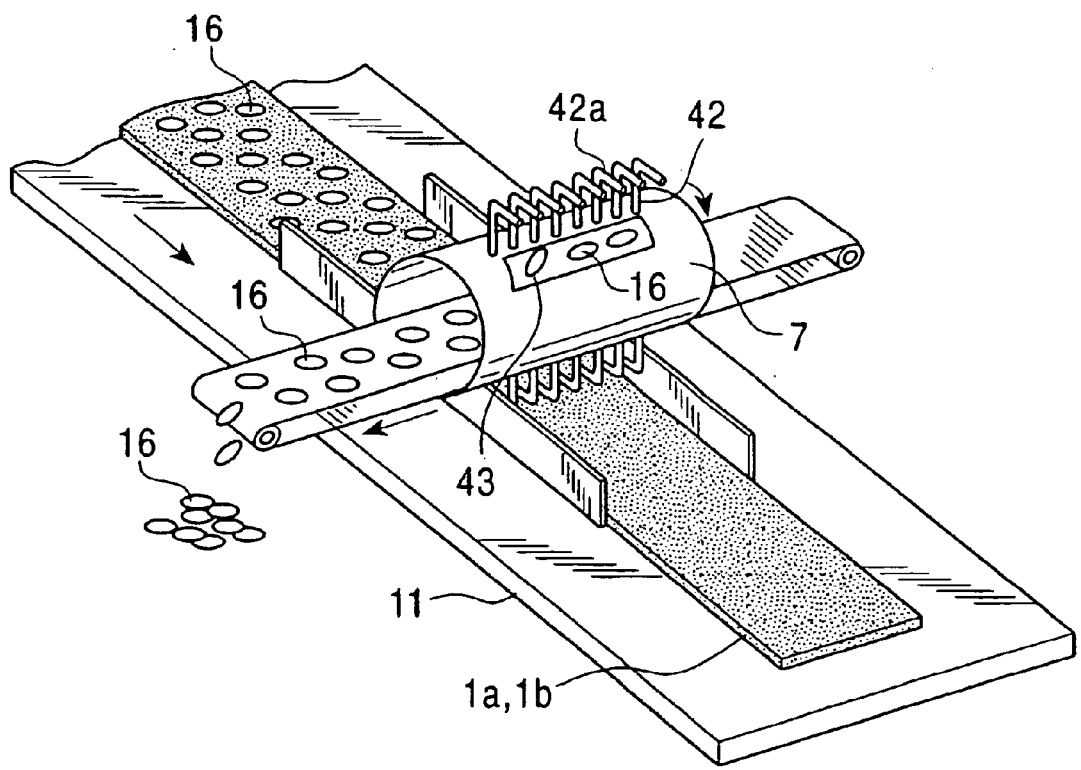
FIG. 23 is a perspective view of the discharging device shown in FIG. 22.

FIGS. 22 and 23 show a combination of the selector S with the transfer conveyor 8, according to another embodiment of the invention. In the embodiment, the transfer conveyor 8 is disposed to pass through the cylindrical rotary drum 7 in the axial direction thereof. The rotary drum 7 is provided with openings 43 formed therein through which the reduced product 16 scooped by the screens 41 or 42 falls onto the transfer conveyor 8.

The transfer conveyor 8 extends along the axis of the rotary drum 7 to the outside of the furnace and synchronized with the rotation of the rotary drum 7 along the arrow in FIG. 23. Thus, the reduced product 16 including reduced iron and slag which is selected on the hearth 11 is separated from the solid reductant of the solid reductant layer 1b and discharged from the furnace.

Figure 24:
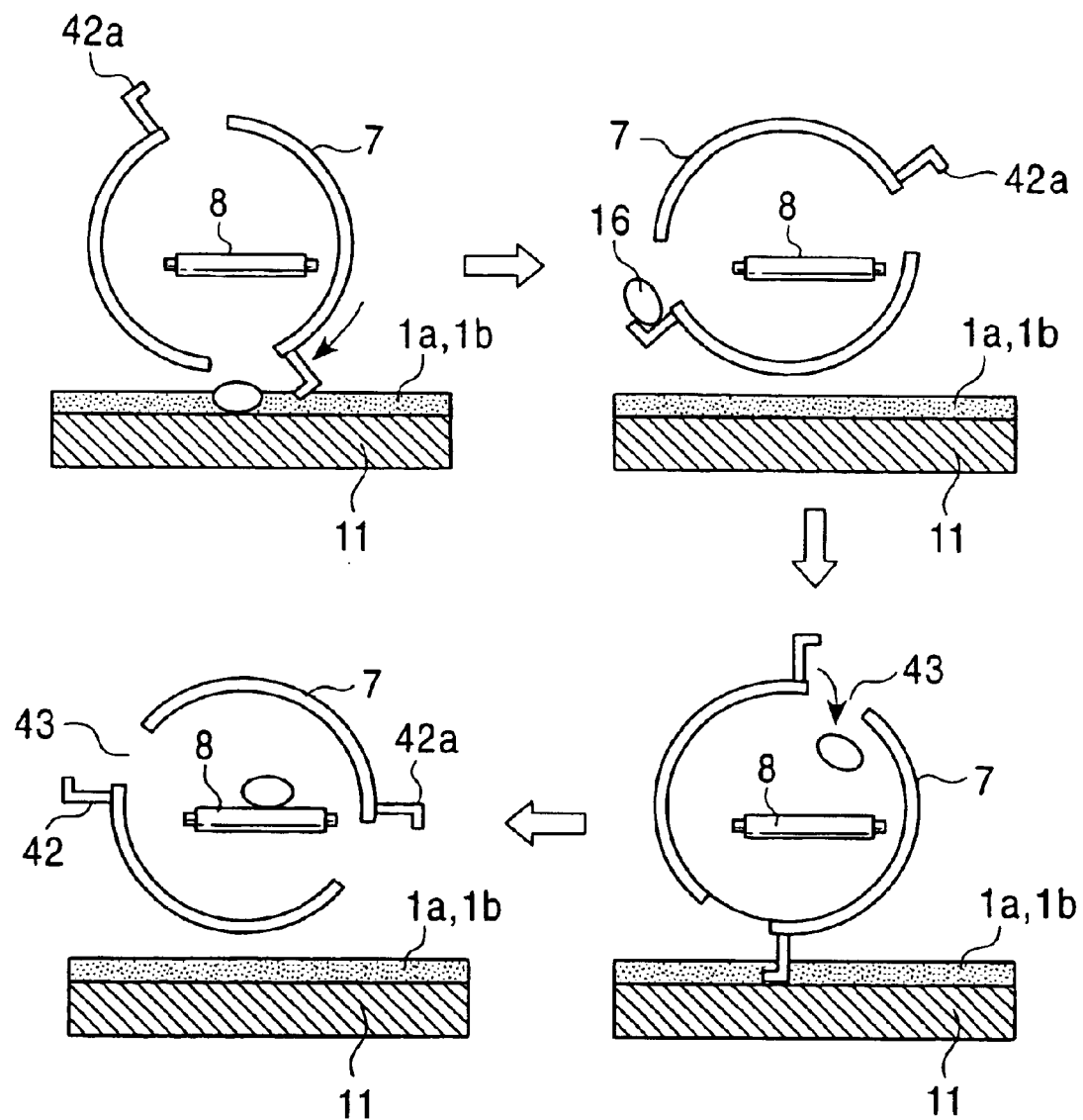
FIG. 24 is an illustration showing a discharge operation in which the reduced product is loaded onto a transfer conveyor passing through a rotary drum.

FIG. 24 is a schematic view showing the operation of the rotary drum 7 and the movement of the reduced product 16, according to the embodiment. As the rotary drum 7 rotates, the comb-shaped screen 42 enters into the solid reductant layer 1b and raises the reduced product 16 including the metal 2 formed by reduction. When the reduced product 16 reaches the upper part of the rotary drum 7, the reduced product 16 falls through the opening 43 onto the transfer conveyor 8 disposed to pass through the rotary drum 7, and is transferred and discharged to the outside of the furnace by the transfer conveyor 8.

Figure 25A:
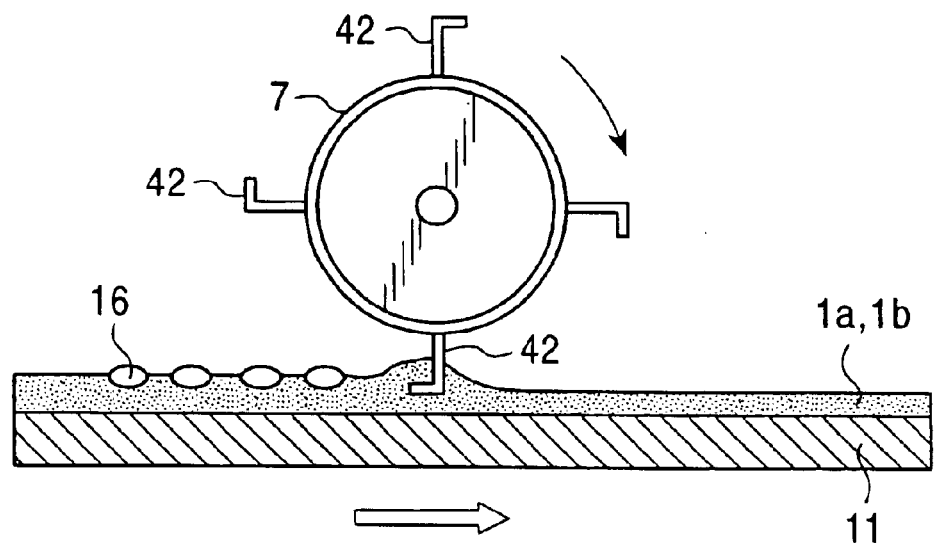
FIGS. 25A, 25B, 25C, and 25D are illustrations showing the solid reductant layer being deformed with the movement of a screen.
Figure 25B:
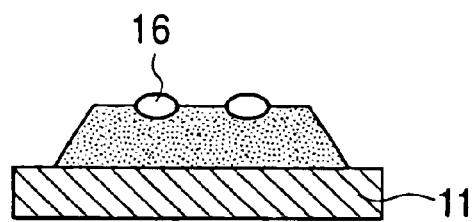
Figure 25C:
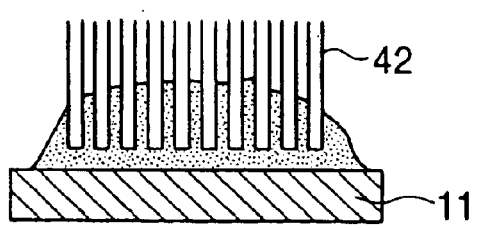
Figure 25D:
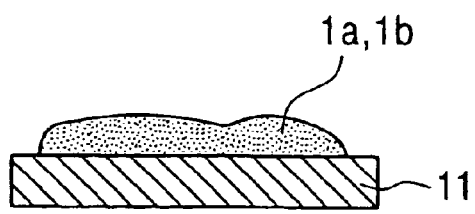

When using the rotary drum 7, the solid reductant layer 1b may be deformed by the resistance of the reduced product 16 to the screens 41 or 42, which is described with reference to FIGS. 25A, 25B, 25C, and 25D. The reduced product 16 is disposed on the solid reductant layer 1b before the reduced product 16 is raised by the screens 41 or 42 of the rotary drum 7, the solid reductant layer 1b being formed flat at the upper part and to have a repose angle at each side face, as shown in FIG. 25B. When the screens 41 or 42 of the rotary drum 7 enter into the solid reductant layer 1b for scooping the reduced product 16, the solid reductant layer 1b rises with the resistance thereof to the screens 41 or 42 and is deformed at ends thereof in the widthwise direction of the hearth 11, as shown in FIG. 25C. Therefore, the solid reductant layer 1b becomes wider and thinner after the reduced product 16 is collected, as shown in FIG. 25D. The solid reductant forming the solid reductant layer 1b may reach one of the widthwise ends of the movable hearth 11 and fall therefrom. When the solid reductant falls, it may produce a resistance to the movement of the movable hearth 11 to cause, in a worst case, suspension of the operation thereof.

Figure 26:
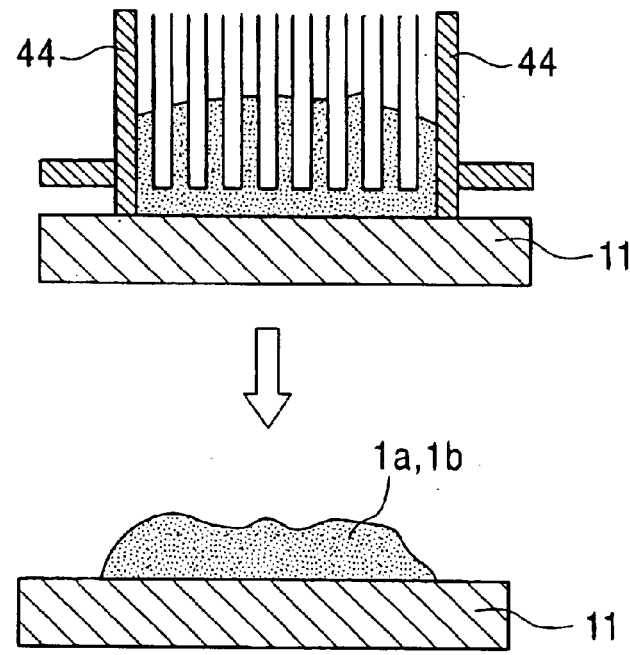
FIG. 26 is an illustration showing the function of side plates for avoiding deformation of the solid reductant layer.

In order to avoid the deformation of the solid reductant layer 1b, side plates 44 may be provided extending in the direction of movement of the hearth 11 such that the screens 41 or 42 pass between the side plates 44, as shown in FIG. 26. With this arrangement, the deformation of the solid reductant layer 1b can be suppressed to a minimum, and the solid reductant can be prevented from moving toward the widthwise ends of the hearth 11.

Figure 27:
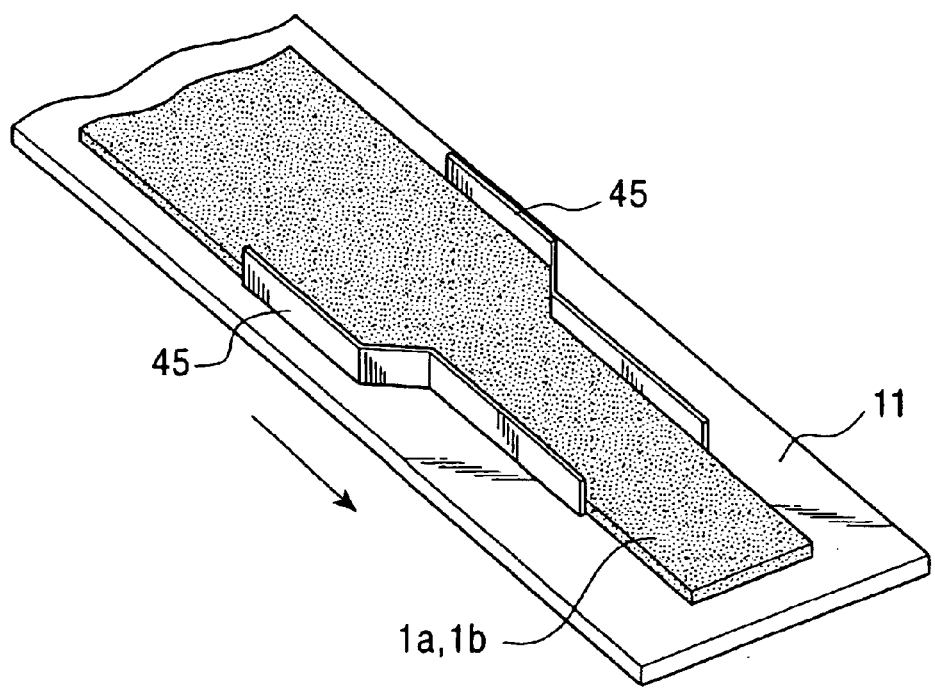
FIG. 27 is a perspective view of guide plates for correcting the width of the solid reductant layer.

Since the width of the solid reductant layer 1b is increased, as the reduced product 16 is collected, even when the deformation of the solid reductant layer 1b can be avoided, the width of the solid reductant layer 1b is preferably corrected by using guide plates 45 extending in the direction of movement of the movable hearth 11, as shown in FIG. 27.

The temperature in the furnace increases to 1500° C. or higher on the movable hearth 11 and to approximately 1000° C. on average at a position at which the reduced product 16 is collected. Therefore, wearing of the screens 41 or 42 fixed to the rotary drum 7 is significant due to the high temperature. Accordingly, the device is preferably cooled. For example, a cooling mist is applied to the screens 41 or 42 of the rotary drum 7, or cooling water is circulated through passages formed in the drum body and/or the screens 41 or 42 of the rotary drum 7, whereby the durability of the device can be increased and the time required for repairs can be decreased, thereby improving the operating rate of the device.

With reference to FIGS. 28 to 32, another embodiment of the discharging device according to the invention is described below.

Figure 28:
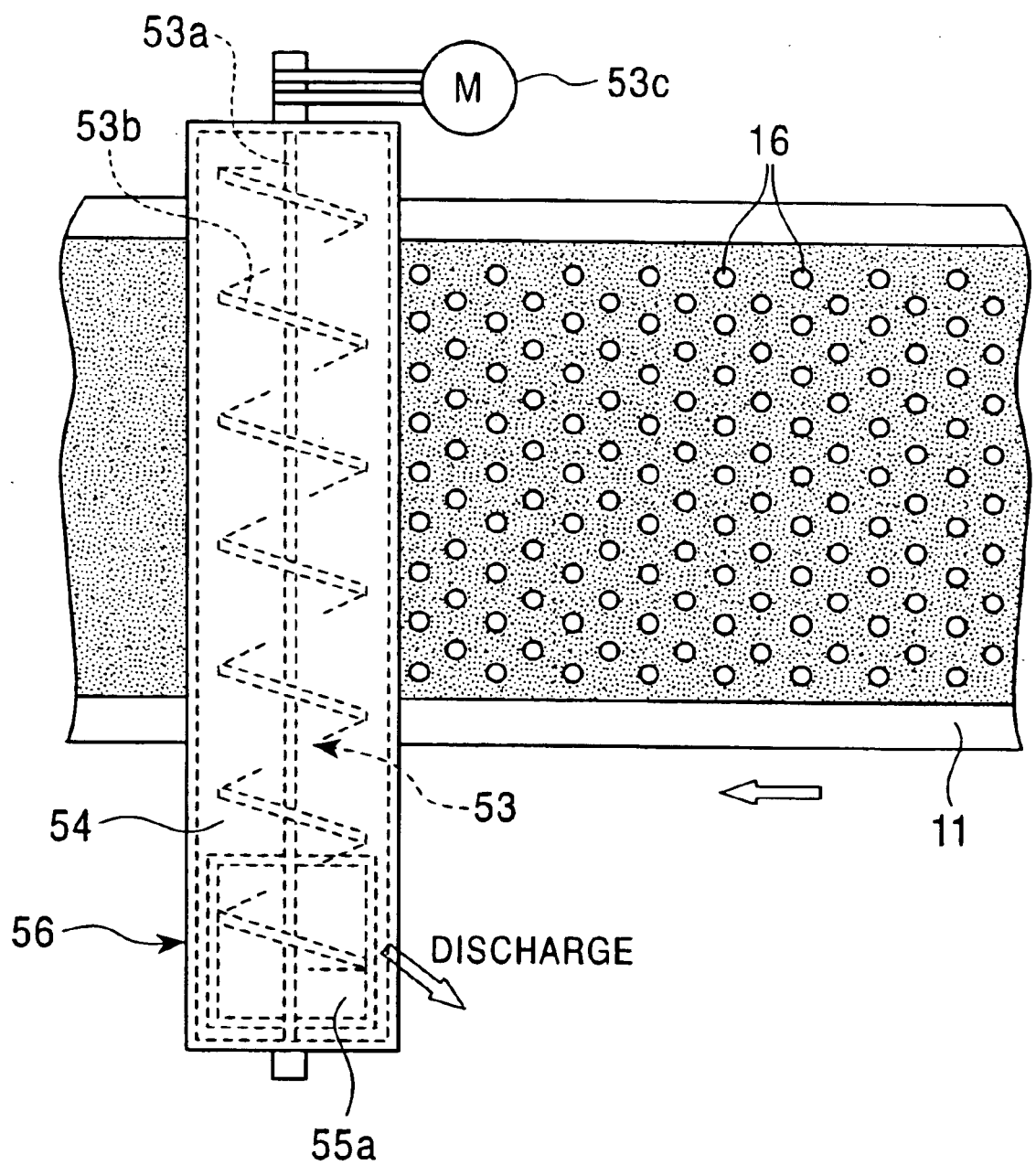
FIG. 28 is an illustration of a discharging device according to another embodiment of the invention.

FIG. 28 is an illustration of a discharging device according to the embodiment of the invention. The discharging device includes a screw feeder 53 and a casing 56. The screw feeder 53 spans the movable hearth 11 substantially perpendicular to the direction of movement of the movable hearth 11 and extending to the outside of the furnace.

Figure 29:
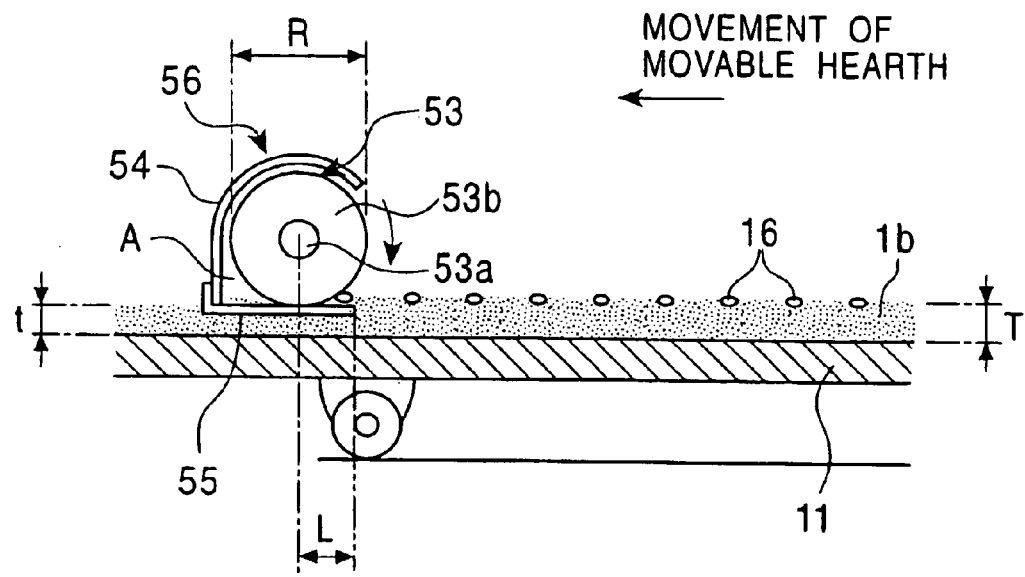
FIG. 29 is an illustration of the discharging device shown in FIG. 28.

In FIG. 29, the casing 56 includes a sidewall 54 which extends along the axis of the screw feeder 53 and covers the screw feeder 53 at at least one side thereof toward the downstream side of the movable hearth 11, and a bottom plate 55 which extends under the screw feeder 53 from the lower end of the sidewall 54 and substantially in parallel to the movable hearth 11.

The screw feeder 53 is formed with a rod 53a provided with a spiral screw 53b about the rod 53a. The spiral screw 53b moves the reduced product 16 by being driven by a motor 53c via the rod 53a, thereby transferring the reduced product 16 to the outside of the furnace.

While being moved by the spiral screw 53b, the reduced product 16 is likely to be clamped between the screw 53b and the solid reductant layer 1b, whereby the reduced product 16 is embedded into the solid reductant of the solid reductant layer 1b disposed on the movable hearth 11.

Therefore, the discharging device is provided with the sidewall 54 which extends along the axis of the screw feeder 53 and covers the screw feeder 53 at at least one side thereof toward the downstream side of the movable hearth 11, and the bottom plate 55 which extends under the screw feeder 53, substantially parallel to the movable hearth 11, and at a given distance therefrom. The casing 56 is open toward the upstream side of the movable hearth 11.

When the reduced product 16 is disposed in the solid reductant layer 1b, the bottom plate 55 of the casing 56 is lowered to the level of the reduced product 16 embedded in the solid reductant layer 1b by vertically moving the casing 56 which receives the screw feeder 53, whereby the reduced product 16 is scooped by the bottom plate 55 and is sent into the screw 53b instead of being depressed under the screw 53b.

The casing 56 may be vertically moved by a screw jack or a mechanism driven by a force using oil pressure, an electric force, pneumatic pressure, or the like.

Figure 30:
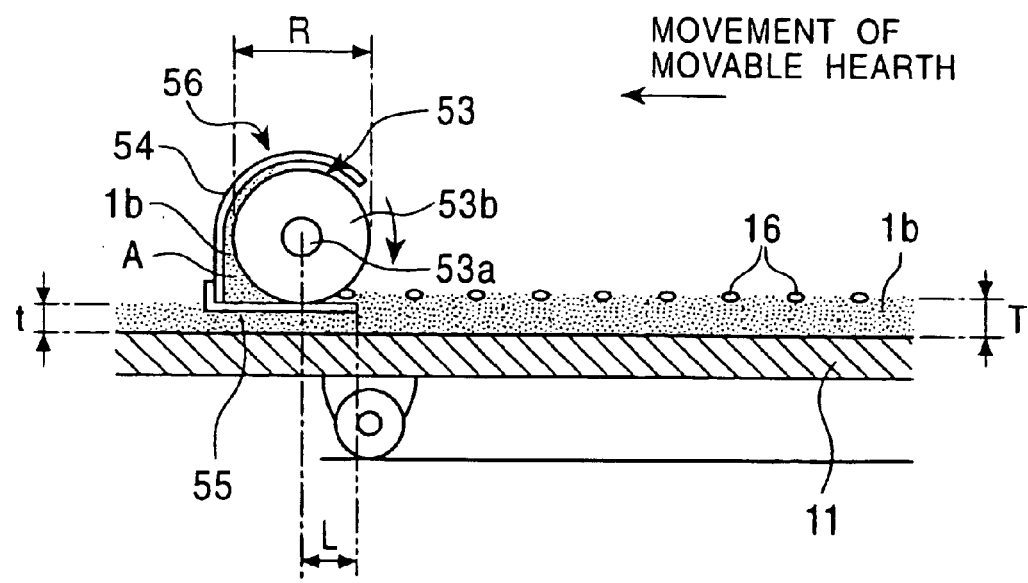
FIG. 30 is an illustration of the discharging device shown in FIG. 29.

In this case, a space A defined by the sidewall 54, the bottom plate 55, and the screw 53b is filled with the solid reductant of the solid reductant layer 1b when the screw feeder 53 starts to operate, as shown in FIG. 30. The solid reductant remains in the space A and is not transferred even after the screw 53b starts to rotate. Therefore, the reduced product 16 sent into the screw 53b as the screw 53b rotates is transferred toward the outside without being sent into the space A due to the solid reductant remaining therein and is discharged from an outlet 55a formed in an end of the bottom plate 55 disposed outside the movable-hearth furnace.

The reduced product 16 disposed in an upper part of the solid reductant layer 1b can be reliably sent into the screw 53b of the screw feeder 53, without being embedded into the solid reductant layer 1b, by a virtue of the bottom plate 55 of the casing 56, whereby almost the entire reduced product 16 can be collected and discharged.

The width of the bottom plate 55 is preferably set in such a manner that a distance L from the end of the bottom plate 55 at the upstream side of the movable hearth 11 to the perpendicular line between the bottom plate 55 and the axis of the screw 53b is set to a value about 0.2 to about 0.3 times a radius R of the screw 53b. When the distance L is smaller than this value, the reduced product 16 passes under the bottom plate 55. When the distance L is larger than this value, the reduced product 16 and the solid reductant are excessively raised before reaching the screw 53b and fall from the sides of the movable hearth 11.

A clearance t between the bottom plate 55 and the movable hearth 11 is set according to the position of the reduced product 16 above the movable hearth 11. The clearance t may be set during operation while confirming a discharged state of the reducing product 16 so that the reduced product 16 can be discharged substantially completely. A thickness T of the solid reductant layer 1b is preferably at least approximately 50 mm. When the thickness T is smaller, the entire solid reductant layer 1b is moved by the bottom plate 55 and discharged more than it is necessary.

The solid reductant layer 1b between the bottom plate 55 and the movable hearth 11 after the reduced product 16 is removed is left on the movable hearth 11. The solid reductant and the raw materials are charged, heated, and melted in the subsequent step. That is, the solid reductant left on the movable hearth 11 is recycled and reused efficiently.

The reduced product 16 used in the above-described embodiments includes metals, slag, and reduced iron pellets.

When the reduced iron pellets are disposed directly on the movable hearth 11, the bottom plate 55 of the casing 56 is lowered such that the bottom plate 55 is brought into contact with the movable hearth 11 (such that the clearance t becomes substantially zero), whereby the reduced iron pellets are substantially completely discharged.

In this case, the space A is also filled with the reduced iron pellets when the screw feeder 53 starts to operate. Thereafter, the reduced iron pellets can be substantially completely discharged by using one screw feeder 53.

Figure 31:
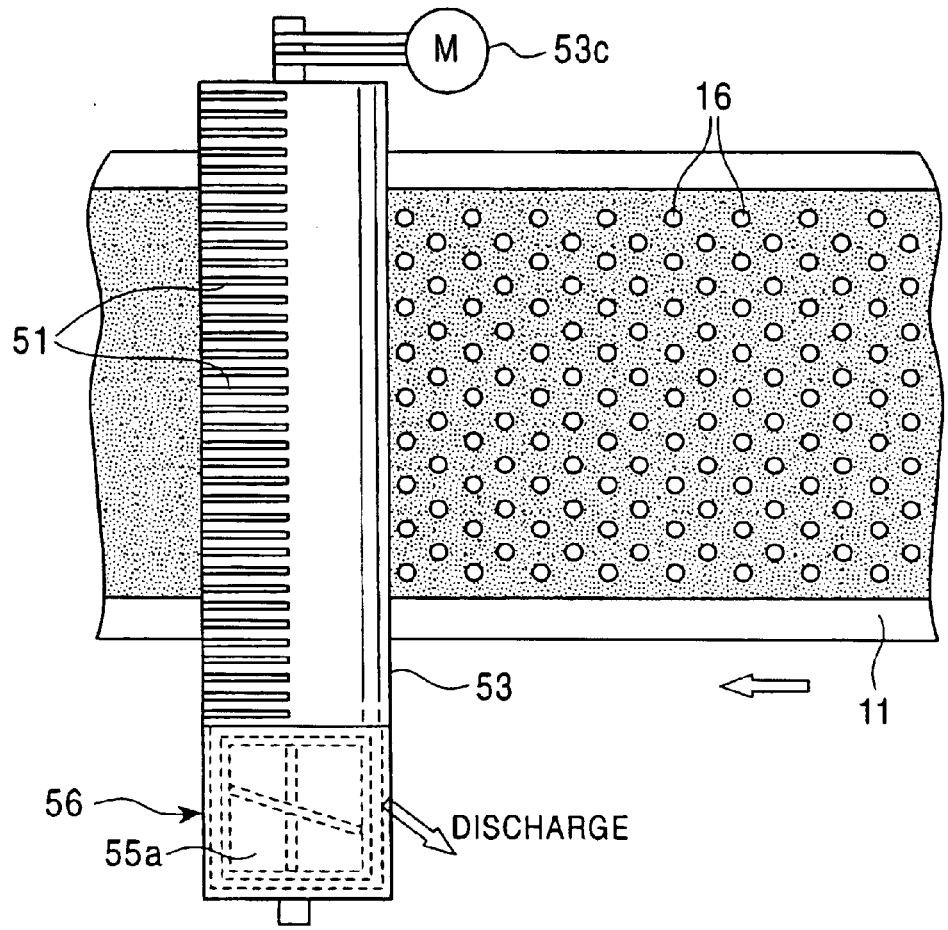
FIG. 31 is an illustration of a discharging device according to another embodiment of the invention.
Figure 32:
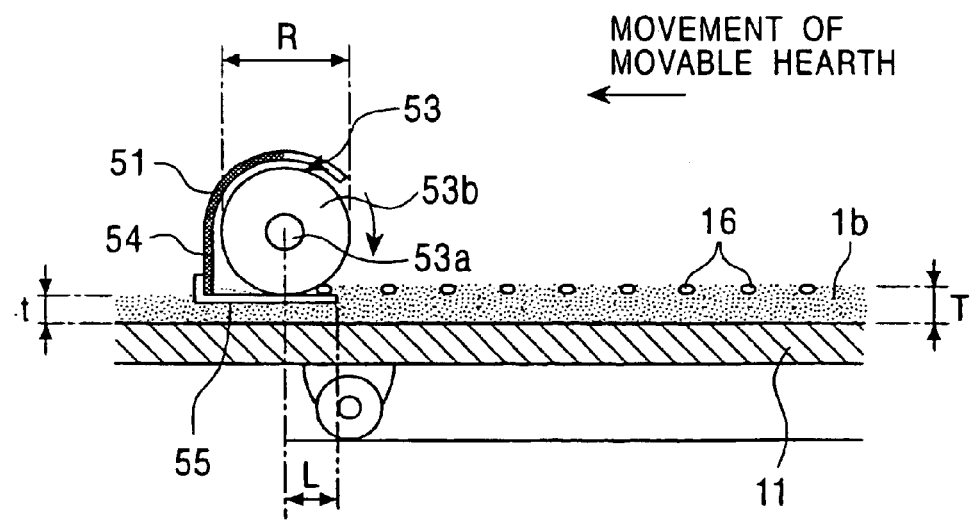
FIG. 32 is an illustration of a discharging device according to another embodiment of the invention.

With reference to FIGS. 31 and 32, a modified example of the discharging device is described below, of which the casing 56 is provided with apertures. The sidewall 54 of the casing 56 shown in FIGS. 31 and 32 is provided with a plurality of apertures 51 each extending vertically and at a uniform distance from others. The size of each aperture 51 is smaller than the grain size of the reduced product 16, whereby the reduced product 16 can be selectively discharged. For example, when the grain size of the reduced product 16 is set to about 5 to about 50 mm, the size of each aperture 51 is preferably set to about 5 mm or larger.

The function of the apertures 51 formed in the casing 56 is not to completely separate the reduced product 16 and the solid reductant from each other, and it is to leave a part of the solid reductant for protection of the hearth 11. That is, the solid reductant having a relatively large grain size may be discharged together with the reduced product 16 to the outside of the furnace by the screw feeder 53.

When the size of each aperture 51 is set smaller than the above-described value, the apertures 51 may be closed with grains of the solid reductant bitten by the apertures 51. Therefore, the size of each aperture 51 is preferably not less than about 5 mm.

Although the sidewall 54 of the casing 56 shown in FIGS. 31 and 32 is provided with the apertures 51, apertures may be also formed in the bottom plate 55 so that the solid reductant having a smaller grain size can be easily discharged from the casing 56 onto the movable hearth 11.

The apertures 51 are provided for returning the solid reductant to the movable hearth 11 through the apertures 51. Therefore, the shape of the apertures 51 is not limited to that which is shown in FIGS. 31 and 32, and it may be such that of, for example, a punched metal or a net.

The casing 56 of the discharging device 15 may be damaged from heat and friction. Therefore, it may have a structure so that it can be cooled by, for example, cooling water. The durability can be improved by being cooled and maintenance charges such as for renewal or repair of the device can be reduced.

Figure 33:
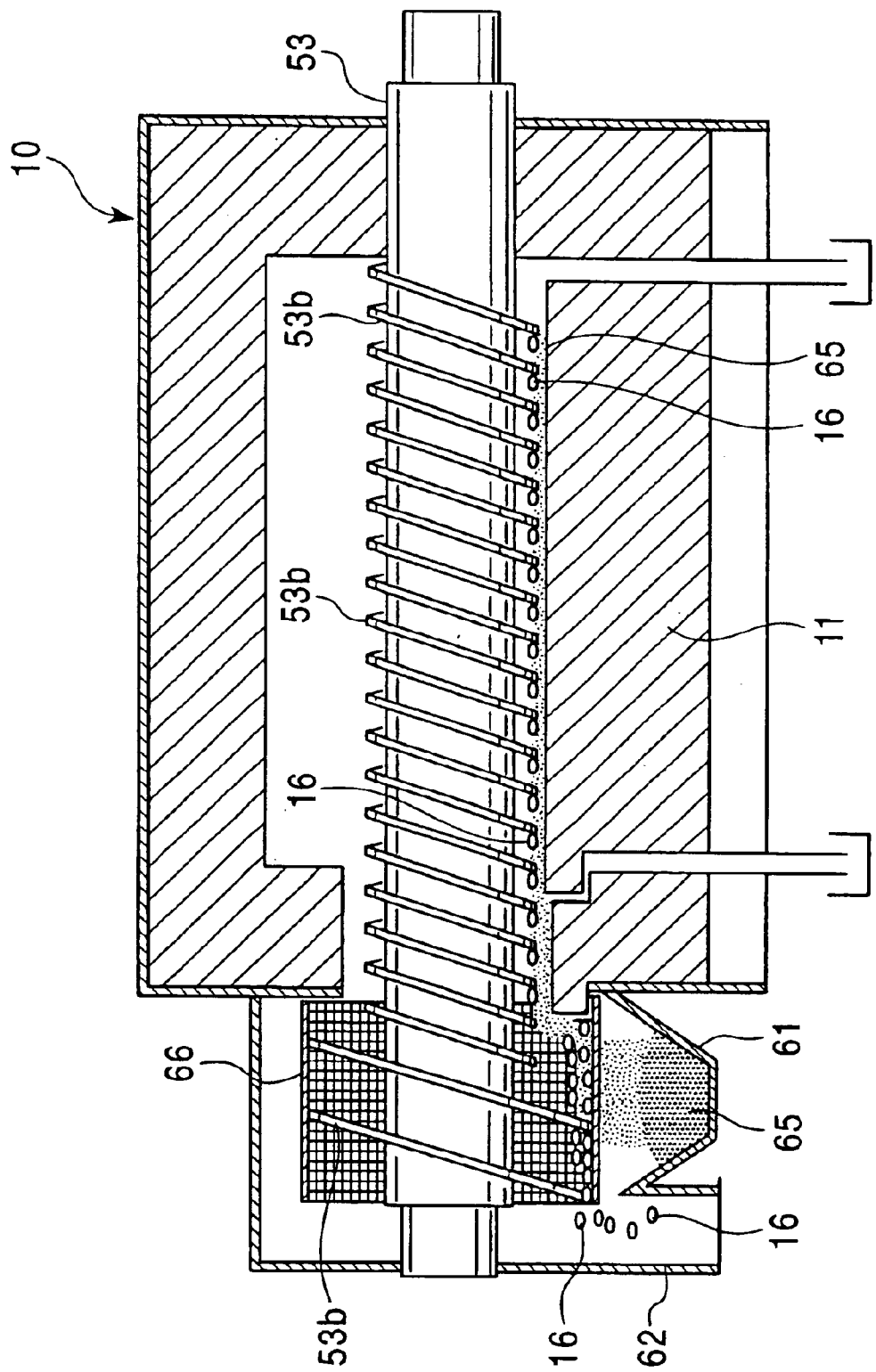
FIG. 33 is a sectional view of a discharging device according to another embodiment of the invention.

A discharging device according to another embodiment of the invention is described with reference to FIG. 33. The discharging device is provided in a discharge section of a movable-hearth furnace 10. The discharging device includes a screw feeder 53 which spans a movable hearth 11 and is disposed substantially perpendicular to the direction of movement of the movable hearth 11, and a reductant-discharging shooter 61 and a reduced-product-discharging shooter 62 which are disposed at an end of the screw feeder 53.

The screw feeder 53 includes a spiral screw 53b about a roller. With the rotation of the spiral screw 53b, the reduced product 16 and the solid reductant 65 used for protecting the surface of the movable hearth 11 are transferred toward the shooters 61 and 62 and are discharged to the outside the furnace.

The screw feeder 53 is provided with a net-basket-shaped cylindrical screen 66 which is coaxially formed at an end of the screw feeder 53 protruding to the outside of the furnace. The rotation of the cylindrical screen 66 and the screw feeder 53 is synchronized with each other. The reductant-discharging shooter 61 is disposed under the cylindrical screen 66, and the reduced-product-discharging shooter 62 is disposed directly under an open end (free end) of the cylindrical screen 66.

With this arrangement, the reduced product 16 and the solid reductant 65 are transferred by the screw 53b toward the outside of the furnace as the screw feeder 53 rotates. The solid reductant 65 which has a smaller grain size passes the cylindrical screen 66 and is discharged to the outside of the furnace via the reductant-discharging shooter 61. Generally, the discharged solid reductant 65 is sent to a charging device such as the charging device 14 shown in FIG. 1, and is deposited on the movable hearth 11 to form the solid reductant layer 1b for protection of the surface of the movable hearth 11.

Accordingly, the reduced product 16 can be separated from the solid reductant 65 while the screw feeder 53 is performing discharging. Since the solid reductant 65 can be returned onto the movable hearth 11 via the charging device 14, a transfer device for a mixture of the reduced product 16 and the solid reductant 65, and screen devices exclusive for the reduced product 16 and the solid reductant 65, respectively, are not necessary. Therefore, the overall size of the device can be reduced, and the configuration of the device can be made simple. The distance of transfer of the solid reductant 65 can be reduced, whereby the temperature decrease in the solid reductant 65 can be suppressed, thereby contributing to the reduction of energy costs.

Another embodiment according to the invention is described with reference to FIG. 34. The discharging device includes a screw feeder 53 provided with a tapered part 68 toward a discharge end-part of the screw feeder 53 on the movable hearth 11. The end part of the screw feeder 53 from the tapered part 68 to the end protruding to the outside of the furnace is formed as a reduced-diameter part 71.

The screw feeder 53 is provided with a conical collecting shooter 69 which covers the screw feeder 53 coaxially with the screw feeder 53 at the tapered part 68 thereof. A discharge cylinder 70 provided with a net-shaped screen 70a about the reduced-diameter part 71 at a portion of the discharge cylinder 70 associated with the movable hearth. The rotation of the discharge cylinder 70 is preferably synchronized with the rotation of the screw feeder 53. The reduced-product-discharging shooter 62 is fixed to the furnace at a free end, that is, an open end of the discharge cylinder 70 protruding to the outside of the furnace.

The size of each mesh of the net-shaped screen 70a is set so that the reduced product 16 having a larger grain size remains in the discharge cylinder 70 and the solid reductant 65 having a smaller grain size falls from the discharge cylinder 70.

Figure 34:
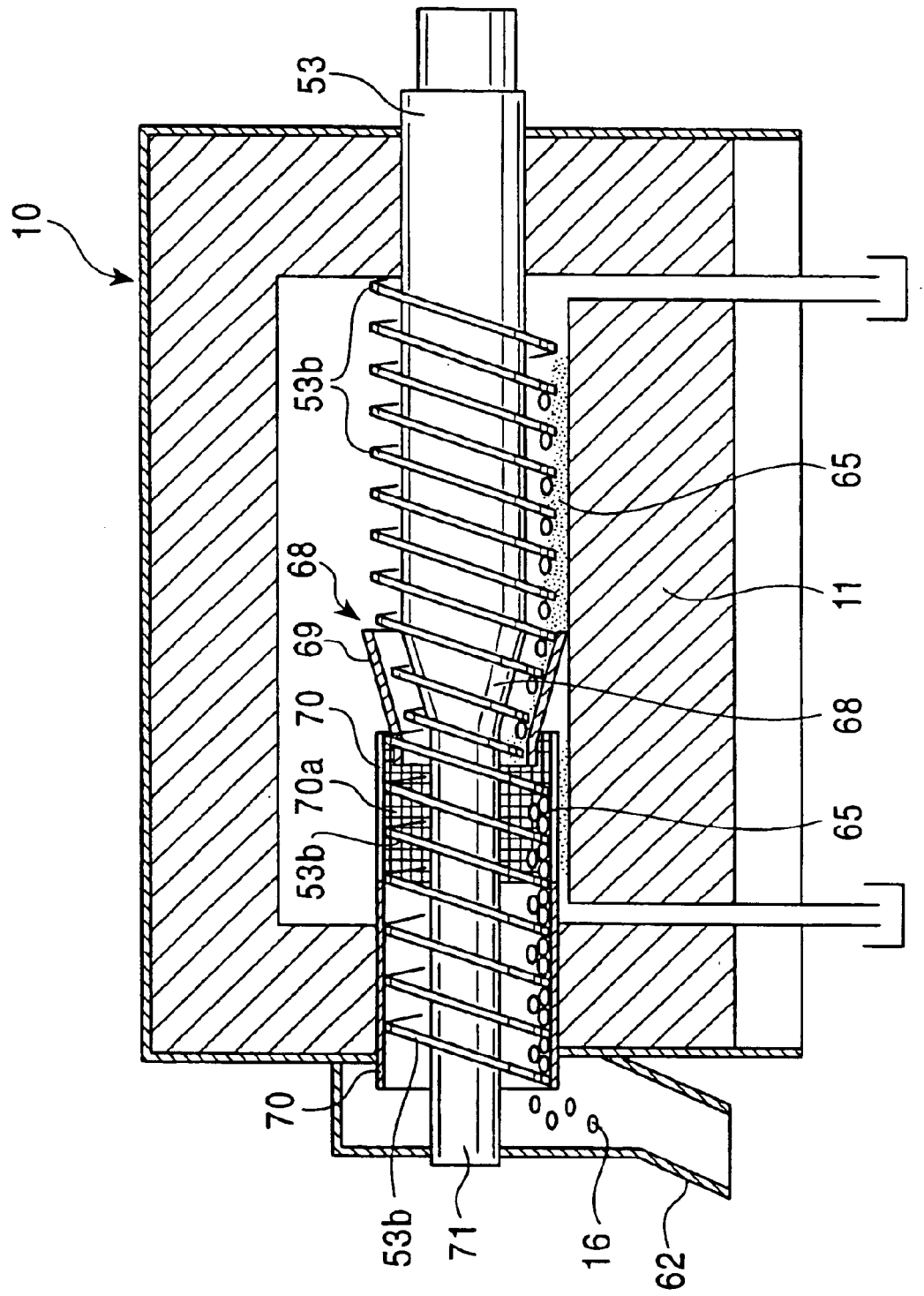
FIG. 34 is a sectional view of a discharging device according to another embodiment of the invention.
Figure 35:
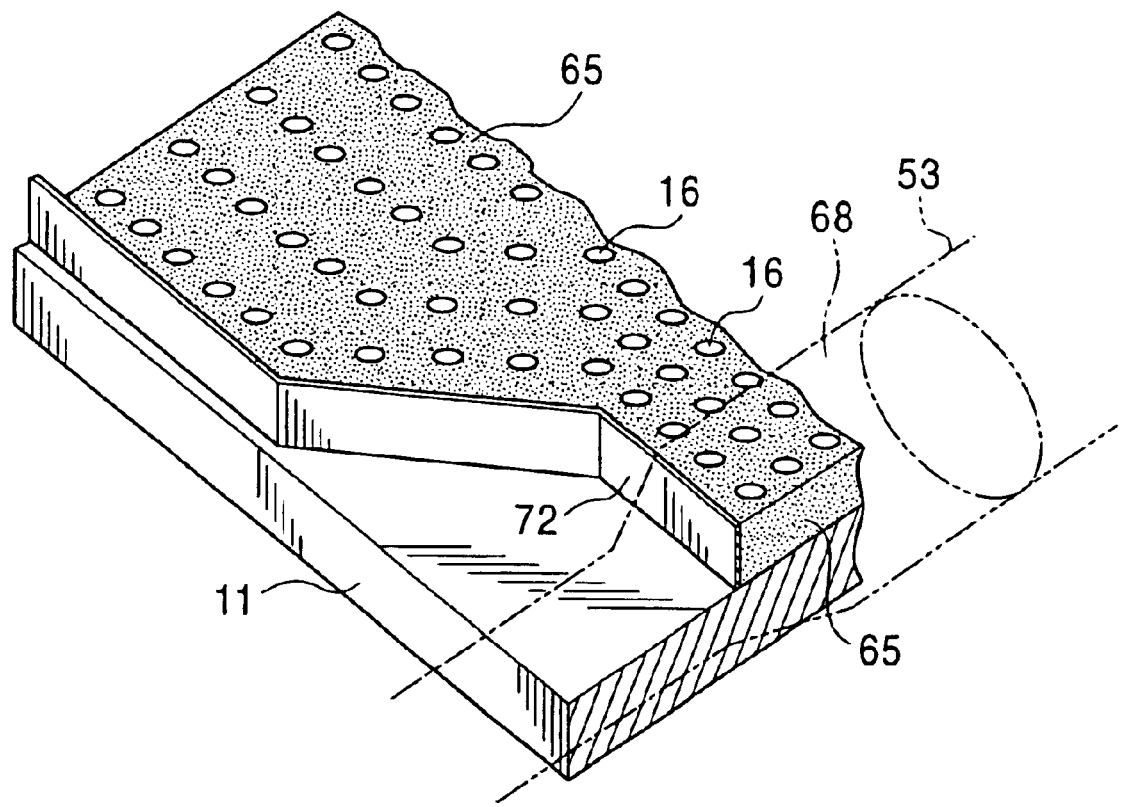
FIG. 35 is a perspective view of a guide plate for reducing the width of a layer including the reduced product and the solid reductant.

In the discharging device shown in FIG. 34, the reduced product 16 and the solid reductant 65 are transferred by the screw 53b along the movable hearth 11, are collected from the movable hearth 11 at the collecting shooter 69, and sent into the discharge cylinder 70. The solid reductant 65 falls away from the discharge cylinder 70 through the mesh of the net-shaped screen 70a, and the reduced product 16 including a metal and slag is discharged to the outside of the furnace through the reduced-product-discharging shooter 62. Since the net-shaped screen 70a of the discharge cylinder 70 is disposed on the movable hearth 11, the solid reductant 65 falls away from the discharge cylinder 70 through the net-shaped screen 70a onto the movable hearth 11.

In the discharging device according to the embodiment, the solid reductant 65 is not discharged outside of the furnace, but is left on the movable hearth 11 to be reused, whereby handling of the solid reductant 65 outside the furnace is not necessary, and the thermal energy can be used efficiently because the solid reductant 65 is not exposed to the outside air.

Since the collecting shooter 69 and the discharge cylinder 70 of the discharging device according to this embodiment are disposed in a discharge section of the movable hearth 11, it is difficult to completely discharge the reduced product 16 and the solid reductant 65. Therefore, a width-reducing guide plate 72 is provided, which moves the reduced product 16 and the solid reductant 65 to a side of the movable hearth 11 toward the end opposite to the discharge end of the screw feeder 53. With this arrangement, the area of the movable hearth 11 can be used efficiently, in which the reduced product 16 and the solid reductant 65 are moved to one side of the movable hearth 11 only in the discharge section of the movable hearth 11.

According to the invention, as described above, damage to a hearth can be avoided, which was not possible in known discharging operations of a product produced on a movable hearth of a movable-hearth furnace. The reduced product such as reduced iron can be collected efficiently by selecting the reduced product on the movable hearth, thereby avoiding dust produced during classification performed outside a furnace, whereby the working environment can be improved. Since only the reduced product is collected and a solid reductant can be left on the hearth for reuse by being sifted, labor required for transportation and the like for reuse of the solid reductant can be reduced. As a result, the loss of thermal energy of the solid reductant can be reduced and operation of the furnace can be made stable.

What is claimed is:

1. A method for discharging a reduced product produced on a movable hearth of a movable-hearth furnace, comprising:

removing the reduced product from the movable hearth by scooping the reduced product and the solid reductant with a screen;

separating the reduced product from a solid reductant by sifting the reduced product and the solid reductant according to the grain size of the reduced product and the solid reductant with the screen;

either leaving substances other than the reduced product on the solid reductant layer or returning the substances onto the solid reductant layer; and discharging the reduced product to the outside of the movable-hearth furnace.

2. The method according to claim 1, wherein sifting the reduced product and the solid reductant according to the grain size of the reduced product and the solid reductant with the screen such that the reduced product and the solid reductant having smaller grain sizes are left on the movable hearth, comprises selecting the reduced product having a larger grain size with a rotary drum which substantially spans the movable hearth of the movable-hearth furnace in the widthwise direction of the movable hearth and is provided with a plurality of net-shaped or comb-shaped screens each extending radially outwardly from the rotary drum from the periphery thereof.

3. The method according to claim 1, wherein sifting the reduced product and the solid reductant according to the grain size of the reduced produce and the solid reductant with the screen such that the reduced product and the solid reductant having smaller grain sizes are left on the movable hearth, comprises removing the reduced product having a larger grain size from the solid reductant layer and discharging the reduced product with a screw feeder having an axis of rotation which substantially spans the movable hearth in the widthwise direction of the movable hearth and extends outwardly of the movable-hearth furnace, and which operates in such a manner that a part of the solid reductant is left on the solid reductant layer by controlling the position of the axis of the screw feeder with respect to the movable hearth.

4. The method according to claim 3, wherein a plurality of apertures are formed in a casing substantially surrounding the screw feeder, the apertures being arrayed substantially along the axis of the screw feeder, such that the reduced product and the solid reductant having smaller grain sizes are left on the solid reductant layer.

5. The method according to claim 4, wherein the casing provided with the plurality of apertures is a cylindrical screen which substantially covers the screw feeder.

6. The method according to claim 3, further comprising:

classifying the reduced product and the solid reductant according to grain size; and returning the reduced product and the solid reductant having smaller grain sizes either onto the solid reductant layer formed on the movable hearth of the movable-hearth furnace or to a layer of mixed raw materials formed on the solid reductant layer.

* * * * *